US011866224B2

(12) United States Patent
Velagapudi et al.

(10) Patent No.: US 11,866,224 B2
(45) Date of Patent: Jan. 9, 2024

(54) SYSTEMS AND METHODS FOR PROVIDING SHIPPING OF ORDERS IN AN ORDER FULFILLMENT CENTER

(71) Applicant: Berkshire Grey Operating Company, Inc., Bedford, MA (US)

(72) Inventors: Prasanna Velagapudi, Pittsburgh, PA (US); Christopher Geyer, Arlington, MA (US); Benjamin Cohen, Somerville, MA (US); Joseph Romano, Arlington, MA (US); Matthew T. Mason, Pittsburgh, PA (US)

(73) Assignee: Berkshire Grey Operating Company, Inc., Bedford, MA (US)

( * ) Notice: Subject to any disclaimer, the term of this patent is extended or adjusted under 35 U.S.C. 154(b) by 201 days.

(21) Appl. No.: 16/910,613

(22) Filed: Jun. 24, 2020

(65) Prior Publication Data

US 2020/0399010 A1  Dec. 24, 2020

Related U.S. Application Data

(60) Provisional application No. 62/865,596, filed on Jun. 24, 2019.

(51) Int. Cl.
*B65D 1/34* (2006.01)
*B65D 1/40* (2006.01)
(Continued)

(52) U.S. Cl.
CPC ............... *B65D 1/34* (2013.01); *B65B 5/068* (2013.01); *B65B 53/00* (2013.01); *B65B 57/02* (2013.01); *B65D 1/40* (2013.01)

(58) Field of Classification Search
CPC .. B65D 1/34; B65D 1/40; B65B 5/068; B65B 53/00
(Continued)

(56) References Cited

U.S. PATENT DOCUMENTS 1,794,212 A * 2/1931 Snyder ............... A47G 7/085
47/84
3,221,971 A * 12/1965 Reny ..................... B65D 1/34
220/675
(Continued)

FOREIGN PATENT DOCUMENTS

AT    299790 B    6/1972
AU    2006204622 A1  3/2007
(Continued)

OTHER PUBLICATIONS

Communication pursuant to Rules 161(1) and 162 EPC issued by the European Patent Office in related European Patent Application No. 20739547.6 dated Feb. 1, 2022, 3 pages.
(Continued)

*Primary Examiner* — Robert F Long
*Assistant Examiner* — Xavier A Madison
(74) *Attorney, Agent, or Firm* — Gesmer Updegrove LLP

(57) ABSTRACT

A standardized shipping tray is disclosed for use in an order fulfillment system. The standardized shipping tray includes a bottom panel that includes raised portions that assist to inhibit rolling on an object within along the bottom panel, and at least two flexible side panels that are adapted to fold inward under a force of a wrapping.

67 Claims, 17 Drawing Sheets

(51) Int. Cl.
*B65B 5/06* (2006.01)
*B65B 53/00* (2006.01)
*B65B 57/02* (2006.01)

(58) Field of Classification Search
USPC .......................................................... 53/441
See application file for complete search history.

(56) References Cited

U.S. PATENT DOCUMENTS

| | | | |
|---|---|---|---|
| 3,266,705 A * | 8/1966 | Wood | B65D 81/1275 229/152 |
| 3,592,326 A | 7/1971 | Zimmerle et al. | |
| 3,971,160 A * | 7/1976 | Vajtay | A01G 9/16 47/84 |
| 4,046,256 A * | 9/1977 | Congleton | B65D 1/34 206/497 |
| 4,173,655 A * | 11/1979 | Capo | B65D 5/4225 229/196 |
| 4,678,390 A | 7/1987 | Bonneton et al. | |
| 4,722,653 A | 2/1988 | Williams et al. | |
| 4,759,439 A | 7/1988 | Hartlepp | |
| 4,846,335 A | 7/1989 | Hartlepp | |
| 4,895,242 A | 1/1990 | Michel | |
| 4,949,897 A * | 8/1990 | Pawlak | B65D 81/262 229/407 |
| 5,076,436 A * | 12/1991 | Bortolani | B65D 75/305 53/433 |
| 5,190,162 A | 3/1993 | Hartlepp | |
| 5,352,081 A | 10/1994 | Tanaka | |
| 5,417,033 A * | 5/1995 | Weder | B65D 85/52 53/399 |
| 5,532,044 A * | 7/1996 | Jen | B65D 5/5035 428/167 |
| 5,738,216 A | 4/1998 | Warner | |
| 5,783,810 A * | 7/1998 | Kelly, Jr. | G06K 17/0029 235/383 |
| 5,806,683 A * | 9/1998 | Gale | B65D 81/025 206/592 |
| 5,839,566 A | 11/1998 | Bonnet | |
| 6,073,761 A * | 6/2000 | Jones | B65D 5/5028 206/583 |
| 6,401,960 B1 * | 6/2002 | Hammett | B65D 1/243 220/519 |
| 6,505,093 B1 | 1/2003 | Thatcher et al. | |
| 6,579,053 B1 | 6/2003 | Grams et al. | |
| 6,685,031 B2 | 2/2004 | Takizawa | |
| 6,762,382 B1 | 7/2004 | Danelski | |
| 6,897,395 B2 | 5/2005 | Shiibashi et al. | |
| 8,776,694 B2 | 7/2014 | Rosenwinkel et al. | |
| 8,892,240 B1 | 11/2014 | Vliet et al. | |
| 9,102,336 B2 | 8/2015 | Rosenwinkel | |
| 9,272,845 B2 | 3/2016 | Honkanen et al. | |
| 9,315,344 B1 * | 4/2016 | Lehmann | G06Q 10/08 |
| 9,481,518 B2 | 11/2016 | Neiser | |
| 9,687,982 B1 | 6/2017 | Jules et al. | |
| 9,751,693 B1 | 9/2017 | Battles et al. | |
| 9,926,138 B1 | 3/2018 | Brazeau et al. | |
| 10,007,827 B2 | 6/2018 | Wagner et al. | |
| 10,029,865 B1 | 7/2018 | McCalib, Jr. et al. | |
| D896,122 S * | 9/2020 | Thorne | D11/143 |
| 10,843,333 B2 | 11/2020 | Wagner et al. | |
| 2001/0030102 A1 | 10/2001 | Woltjer et al. | |
| 2001/0038784 A1 | 11/2001 | Peltomaki | |
| 2002/0087231 A1 | 7/2002 | Lewis et al. | |
| 2002/0092801 A1 | 7/2002 | Dominguez | |
| 2002/0157919 A1 | 10/2002 | Sherwin | |
| 2002/0179502 A1 | 12/2002 | Cerutti et al. | |
| 2003/0038065 A1 | 2/2003 | Pippin et al. | |
| 2004/0091078 A1 | 5/2004 | Ambrefe, Jr. | |
| 2005/0155887 A1 | 7/2005 | Bazany et al. | |
| 2007/0051585 A1 | 3/2007 | Scott et al. | |
| 2007/0132580 A1 | 6/2007 | Ambrefe, Jr. | |
| 2007/0185613 A1 | 8/2007 | Feldenzer | |
| 2007/0209976 A1 | 9/2007 | Worth et al. | |

| | | | |
|---|---|---|---|
| 2008/0181753 A1 | 7/2008 | Bastian et al. | |
| 2009/0000912 A1 | 1/2009 | Battles et al. | |
| 2010/0122942 A1 | 5/2010 | Harres et al. | |
| 2010/0318216 A1 | 12/2010 | Faivre et al. | |
| 2011/0061995 A1 | 3/2011 | Huff et al. | |
| 2011/0144798 A1 | 6/2011 | Freudelsperger | |
| 2011/0238207 A1 | 9/2011 | Bastian, II et al. | |
| 2011/0243707 A1 | 10/2011 | Dumas et al. | |
| 2012/0118699 A1 | 5/2012 | Buuchmann et al. | |
| 2012/0177465 A1 | 7/2012 | Koholka | |
| 2013/0110280 A1 | 5/2013 | Folk | |
| 2013/0166062 A1 | 6/2013 | Casey et al. | |
| 2014/0244026 A1 | 8/2014 | Neiser | |
| 2014/0291112 A1 | 10/2014 | Lyon et al. | |
| 2014/0364998 A1 | 12/2014 | Neiser et al. | |
| 2015/0098775 A1 | 4/2015 | Razumov | |
| 2015/0104286 A1 | 4/2015 | Hansl et al. | |
| 2015/0114799 A1 | 4/2015 | Hansl et al. | |
| 2015/0164252 A1 * | 6/2015 | Sloat | B65D 1/42 493/405 |
| 2015/0232238 A1 | 8/2015 | Wu | |
| 2015/0375880 A1 | 12/2015 | Ford et al. | |
| 2015/0379494 A1 * | 12/2015 | Hiroi | G06V 10/40 705/16 |
| 2016/0007737 A1 | 1/2016 | Clark et al. | |
| 2016/0221187 A1 | 8/2016 | Bradski et al. | |
| 2016/0221762 A1 | 8/2016 | Schroader | |
| 2016/0244262 A1 | 8/2016 | O'Brien et al. | |
| 2016/0355337 A1 | 12/2016 | Lert et al. | |
| 2017/0043953 A1 | 2/2017 | Battles et al. | |
| 2017/0076251 A1 | 3/2017 | Simske et al. | |
| 2017/0080566 A1 | 3/2017 | Stubbs et al. | |
| 2017/0080571 A1 | 3/2017 | Wagner et al. | |
| 2017/0106532 A1 | 4/2017 | Wellman et al. | |
| 2017/0121113 A1 | 5/2017 | Wagner et al. | |
| 2017/0136632 A1 | 5/2017 | Wagner et al. | |
| 2017/0157648 A1 | 6/2017 | Wagner et al. | |
| 2017/0225330 A1 | 8/2017 | Wagner et al. | |
| 2017/0320625 A1 | 11/2017 | Eckert et al. | |
| 2017/0322561 A1 | 11/2017 | Stiernagle | |
| 2017/0349385 A1 | 12/2017 | Moroni et al. | |
| 2017/0369244 A1 | 12/2017 | Battles et al. | |
| 2018/0085788 A1 | 3/2018 | Engel et al. | |
| 2018/0130015 A1 | 5/2018 | Jones et al. | |
| 2018/0244473 A1 | 8/2018 | Mathi et al. | |
| 2018/0265311 A1 | 9/2018 | Wagner et al. | |
| 2018/0273295 A1 | 9/2018 | Wagner et al. | |
| 2018/0273296 A1 | 9/2018 | Wagner et al. | |
| 2018/0273297 A1 | 9/2018 | Wagner et al. | |
| 2018/0273298 A1 | 9/2018 | Wagner et al. | |
| 2018/0282065 A1 | 10/2018 | Wagner et al. | |
| 2018/0282066 A1 | 10/2018 | Wagner et al. | |
| 2018/0312336 A1 | 11/2018 | Wagner et al. | |
| 2018/0327198 A1 | 11/2018 | Wagner et al. | |
| 2019/0022702 A1 | 1/2019 | Vegh et al. | |
| 2019/0185267 A1 | 6/2019 | Mattern et al. | |
| 2019/0270537 A1 | 9/2019 | Amend, Jr. et al. | |
| 2019/0361672 A1 * | 11/2019 | Odhner | B25J 19/021 |
| 2020/0031593 A1 | 1/2020 | Usami et al. | |
| 2020/0223058 A1 * | 7/2020 | Wagner | B65G 1/1376 |
| 2022/0135347 A1 * | 5/2022 | Cohen | B25J 9/1687 700/245 |

FOREIGN PATENT DOCUMENTS

| | | |
|---|---|---|
| AU | 2014315755 A1 | 4/2016 |
| CA | 3029834 A1 | 1/2018 |
| CH | 432368 A | 3/1967 |
| CN | 1081963 A | 2/1994 |
| CN | 1203559 A | 12/1998 |
| CN | 101282884 A | 10/2008 |
| CN | 101484373 A | 7/2009 |
| CN | 201520176 U | 7/2010 |
| CN | 101808916 A | 8/2010 |
| CN | 101823626 A | 9/2010 |
| CN | 102112688 A | 6/2011 |
| CN | 102131718 A | 7/2011 |
| CN | 102357057 A | 2/2012 |
| CN | 202147556 U | 2/2012 |

(56) References Cited

FOREIGN PATENT DOCUMENTS

| | | |
|---|---|---|
| CN | 102390701 A | 3/2012 |
| CN | 202918665 U | 5/2013 |
| CN | 104010953 A | 8/2014 |
| CN | 104246801 A | 12/2014 |
| CN | 104379460 A | 2/2015 |
| CN | 104470822 A | 3/2015 |
| CN | 105346829 A | 2/2016 |
| CN | 105853219 A | 8/2016 |
| CN | 106041517 A | 10/2016 |
| CN | 106315096 A | 1/2017 |
| CN | 106395225 A | 2/2017 |
| CN | 106999987 A | 8/2017 |
| CN | 206456936 U | 9/2017 |
| CN | 107250004 A | 10/2017 |
| CN | 107264376 A | 10/2017 |
| CN | 107430719 A | 12/2017 |
| CN | 107635896 A | 1/2018 |
| CN | 107708940 A | 2/2018 |
| CN | 108778636 A | 11/2018 |
| CN | 109641677 A | 4/2019 |
| CN | 110001318 A | 7/2019 |
| DE | 4127933 A1 | 2/1993 |
| DE | 102005061309 A1 | 7/2007 |
| DE | 102006057658 A1 | 6/2008 |
| DE | 102007023909 A1 | 11/2008 |
| DE | 102007038834 A1 | 2/2009 |
| DE | 102010002317 A1 | 8/2011 |
| EP | 0235488 A1 | 9/1987 |
| EP | 1995192 A2 | 11/2008 |
| EP | 2650237 B1 | 11/2014 |
| EP | 3112295 A1 | 1/2017 |
| ES | 1069298 U | 3/2009 |
| FR | 2832654 A1 | 5/2003 |
| JP | S54131278 A | 10/1979 |
| JP | S59149204 A | 8/1984 |
| JP | S63310406 A | 12/1988 |
| JP | H0395001 A | 4/1991 |
| JP | H03187816 A | 8/1991 |
| JP | 2000238906 A | 9/2000 |
| JP | 2007182286 A | 7/2007 |
| JP | 2008037567 A | 2/2008 |
| JP | 2014141313 A | 8/2014 |
| KR | 100836285 B1 | 6/2008 |
| WO | 03074201 A1 | 9/2003 |
| WO | 2006012074 A1 | 2/2006 |
| WO | 2007009136 A1 | 1/2007 |
| WO | 2008091733 A2 | 7/2008 |
| WO | 2010017872 A1 | 2/2010 |
| WO | 2011038442 A2 | 4/2011 |
| WO | 2012103566 A1 | 8/2012 |
| WO | 2013178431 A1 | 5/2013 |
| WO | 2014166650 A1 | 10/2014 |
| WO | 2015035300 A1 | 3/2015 |
| WO | 2015118171 A1 | 8/2015 |
| WO | 2017036780 A1 | 3/2017 |
| WO | 2018175466 A1 | 9/2018 |
| WO | 2018176033 A1 | 9/2018 |

OTHER PUBLICATIONS

Notification Concerning Transmittal of International Preliminary Report on Patentability and the International Preliminary Report on Patentability issued by the International Bureau of WIPO in related International Application No. PCT/US2020/039313 dated Jan. 6, 2022, 13 pages.
International Search Report and Written Opinion of the International Searching Authority in related International Application No. PCT/US2020/039313 dated Nov. 13, 2020, 18 pages.
Examiner's Report issued by the Innovation, Science and Economic Development Canada (Canadian Intellectual Property Office) in related Canadian Patent Application No. 3,145,402 dated Feb. 13, 2023, 6 pages.
Notice on the First Office Action issued by the China National Intellectual Property Administration in related Chinese Patent Application No. 202210315249.6 dated Mar. 25, 2023, 13 pages.
Cipolla et al., Visually guided grasping in unstructured environments, Robotics and Autonomous Systems 19.3-4 (1997): 337-346.
sping in Unstructured Environments, Journal of Robotics and Autonomous Systems (Invited Paper), 20 pages.
Communication pursuant to Rules 161(1) and 162 EPC issued by the European Patent Office in related European Patent Application No. 18807485.0 dated Oct. 16, 2020, 3 pages.
Communication pursuant to Rules 161(1) and 162 EPC issued by the European Patent Office in related European Patent Application No. 19716256.3 dated Oct. 13, 2020, 3 pages.
Examiner's Report issued by the Innovation, Science and Economic Development Canada Canadian Intellectual Property Office in related Canadian Patent Application No. 3,090,647 dated Sep. 22, 2021, 4 pages.
Examiner's Report issued by the Innovation, Science and Economic Development Canada Canadian Intellectual Property Office in related Canadian Patent Application No. 3,090,819 dated Sep. 22, 2021, 3 pages.
International Preliminary Report on Patentability issued by the International Bureau of WIPO in related International Application No. PCT/US2019/020530 dated Sep. 8, 2020, 12 pages.
International Preliminary Report on Patentability issued by the International Bureau of WIPO in related International Application No. PCT/US2018/058193 dated Sep. 8, 2020, 12 pages.
International Search Report and Written Opinion for International Application No. PCT/US2018/058193 dated Feb. 13, 2019, 15 pages.
International Search Report and Written Opinion for International Application No. PCT/US2019/020530 dated Aug. 12, 2019, 18 pages.
Klingbeil et al., Grasping with Application to an Autonomous Checkout Robot, ResearchGate, Conference Paper in Proceedings—IEEE International Conference on Robotics and Automation—Jun. 2011, IEEE Xplore, 9 pages.
Lian et al., Design and application of radiopharmaceutical delivery box.
Non-Final Office Action issued by the U.S. Patent and Trademark Office in related U.S. Appl. No. 16/001,630 dated Dec. 3, 2019, 31 pages.
Non-Final Office Action issued by the U.S. Patent and Trademark Office in related U.S. Appl. No. 16/291,506 dated Jun. 23, 2021, 16 pages.
Notice on First Office Action and First Office Action (along with its English translation) issued by the China National Intellectual Property Administration in related Chinese Patent Application No. 201880090771.0 dated May 24, 2021, 26 pages.
Notice on First Office Action and First Office Action (along with its English translation) issued by the China National Intellectual Property Administration in related Chinese Patent Application No. 201980017008.X dated May 31, 2021, 15 pages.
Rembold et al., Object Turning for Barcode Search, Proceedings of the 2000 IEEE/RSJ International Conference on Intelligent Robots and Systems, pp. 1267-1272.
Supplementary Search Report, along with its English translation, issued by the China National Intellectual Property Administration in related Chinese Patent Application No. 201980017008.X dated Jan. 6, 2022, 5 pages.
Zhang et al., A multi-channel fully automated flux box system for measuring CO-2 exchange fluxes between terrestrial ecosystems and the atmosphere.
Non-Final Office Action issued by the United States Patent and Trademark Office in related U.S. Appl. No. 17/065,042 dated Jan. 9, 2023, 27 pages.
Non-Final Office Action issued by the United States Patent and Trademark Office in related U.S. Appl. No. 17/509,589 dated Jan. 30, 2023, 26 pages.
Notice on the First Office Action issued by the China National Intellectual Property Administration in related Chinese Patent Application No. 202210046070.5 dated Mar. 30, 2023, 24 pages.
Notice on Grant of Patent Right for Invention and Search Report, along with its English translation, issued by the China National

(56) References Cited

OTHER PUBLICATIONS

Intellectual Property Administration with the Notice on Grant in related Chinese Patent Application No. 202210046070.5 dated Sep. 28, 2023, 9 pages.

* cited by examiner

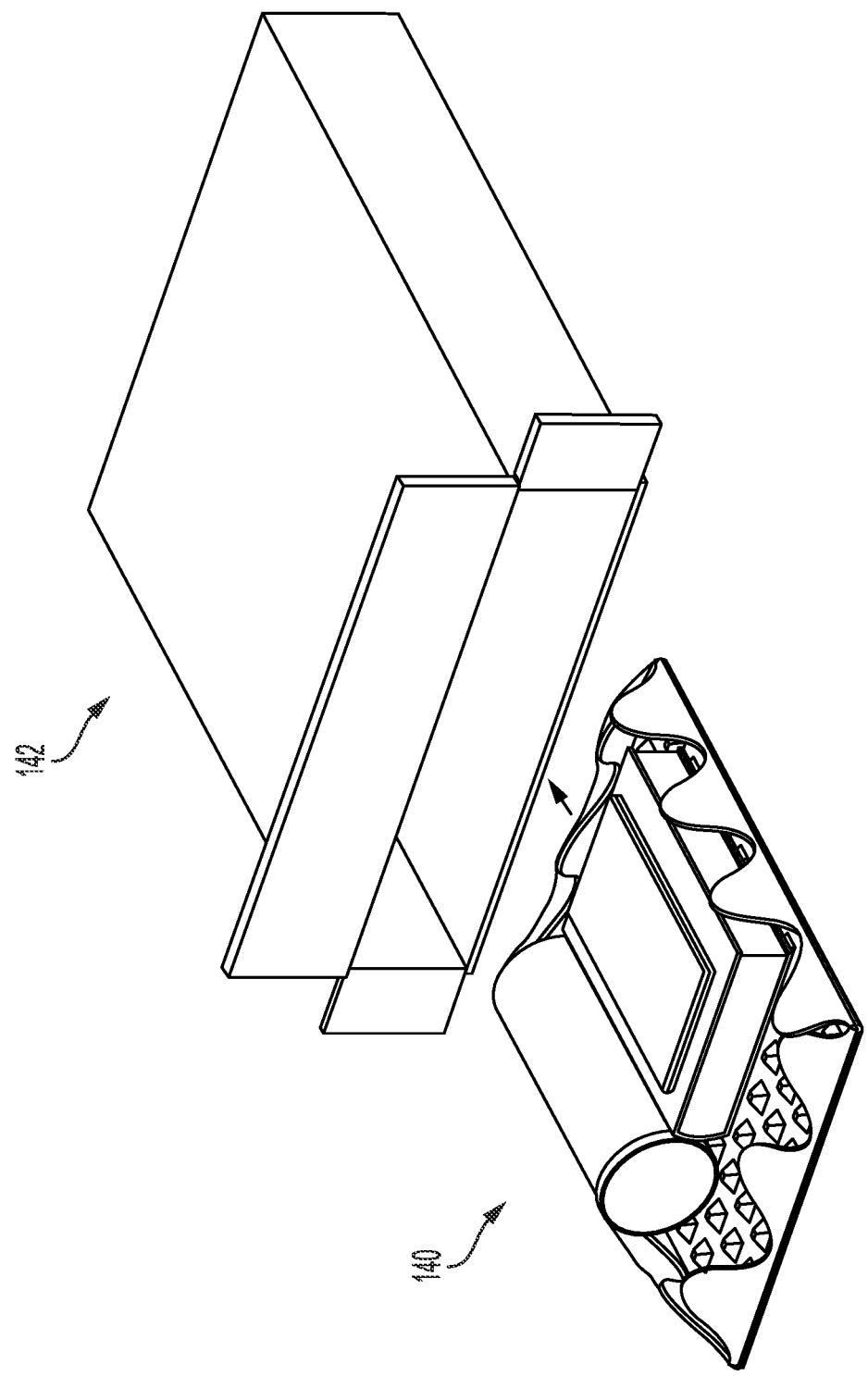

SYSTEMS AND METHODS FOR PROVIDING SHIPPING OF ORDERS IN AN ORDER FULFILLMENT CENTER

PRIORITY

The present application claims priority to U.S. Provisional Patent Application Ser. No. 62/865,596, filed Jun. 24, 2019, the disclosure of which is hereby incorporated by reference in its entirety.

BACKGROUND

The invention generally relates to order fulfillment centers and systems, and relates in particular to e-commerce order fulfillment system from which orders are shipped.

An order fulfillment center holds inventory and ships from that inventory packages that fulfill customers' orders. Inventory may be held on shelves and picked manually, or may be held in automated storage and retrieval systems (AS/RS).

The picking of orders may be achieved in a variety of ways, for example, employing human personnel. Personnel may generally employ batch picking (pick less, sort now) or wave picking (pick more, sort later). In particular, in places where personnel are manually picking units from shelves, it is common to optimize the efficiency of the walking and picking process, so that as many goods as possible are picked while walking up and down aisles of shelves. In batch picking, personnel may push a cart up and down the aisles that will hold bins for multiple individual orders. When the personnel arrives at the location of a unit needing to be picked, he or she will pick that unit and place it into the tote or bin corresponding to the order. In this case, the worker is sorting the unit into the correct order. At the end of the tour through the shelves, all of the orders on the cart will be complete—no units will remain to be picked for those orders—and all units will be sorted into orders, and ready to be shipped.

The completed objects for an order may be gathered in a box or shipping bag, e.g., a polyethylene bag, for shipping in a delivery system. The packaging of such orders into a box or a shipping bag has traditionally been done by human personnel due to variations in packing objects, such as for example, movement of objects during the packing of multiple object orders, as well as a need in certain applications for the use of packing materials such as foam, bubble wrap or packing peanuts.

An automated system (such as a system including a programmable motion device) for packing multiple objects into a box however, may have difficulties packing objects where some objects have low pose authority (the ability to maintain a single pose when grasped) or may have low position authority (the ability to remain at a location when placed), and/or where the automated system must accommodate avoiding contact with the inside surfaces of walls of the box.

There is a need therefore, for systems and methods for packing and shipping orders, particularly multiple object orders, involving the use of programmable motion devices, wherein the systems or methods may more efficiently and economically pack multiple varied objects for shipping.

SUMMARY

In accordance with an aspect, the invention provides a standardized shipping tray for use in a packaging fulfillment system. The standardized shipping tray includes a bottom panel that includes raised portions that assist to inhibit rolling of an object within the shipping tray along the bottom panel, and at least two flexible side panels that are adapted to fold inward under a force of a wrapping.

In accordance with another aspect, the invention provides an object processing system for processing objects. The object processing system includes an input conveyance system by which objects are provided to at least one programmable motion device, a shipping tray conveyance system by which shipping trays are provided to the programmable motion device, and a non-transitory computer processing system for storing information regarding geometrical features of the shipping tray, the geometrical features including protrusions from a bottom panel of the shipping tray, and the geometrical features facilitating the loading of objects into the shipping tray by the programmable motion device.

In accordance with a further aspect, the invention provides a method of processing objects. The method includes receiving objects on an input conveyance system at at least one programmable motion device, providing shipping trays to the programmable motion device, and loading objects onto at least one shipping tray responsive to geometrical features of the shipping tray, the geometrical features including protrusions from a bottom panel of the shipping tray, and the geometrical features facilitating the loading of objects into the shipping tray by the programmable motion device.

BRIEF DESCRIPTION OF THE DRAWINGS

The following detailed description may be further understood with reference to the accompanying drawings in which:

FIG. 20 shows an illustrative diagrammatic view of the loaded wrapped shipping tray of FIG. 19 being loaded into a shipping container in accordance with an aspect of the present invention.

The drawings are shown for illustrative purposes only.

DETAILED DESCRIPTION

In accordance with various aspects, the invention provides a holder that is shipped with and contains one or more objects to be shipped. The holder prevents objects from moving within the holder when placed in the holder, and is designed to readily accept and accommodate being shrink wrapped in certain aspects of the invention.

In some aspects, the invention is provided as a molded container that is roughly tray-shaped, with a bottom and short sidewall like features, and that is designed to contain one or more objects prior to being processed by a shrink-wrapping machine. The container also includes a bottom with an ordered array of bumps, or a non-ordered set of bumps, that prevent round or cylindrical objects (e.g., objects with low placement authority) from rolling within the container. In certain embodiments, the container includes sidewalls with intermittently extending wall portions that prevent objects from falling out of the tray, and that also become folded down onto the objects when subjected to shrink-wrapping. The container may be formed of any of molded cardboard pulp, paper pulp fiber or thermoformed fiber.

Figure 1:
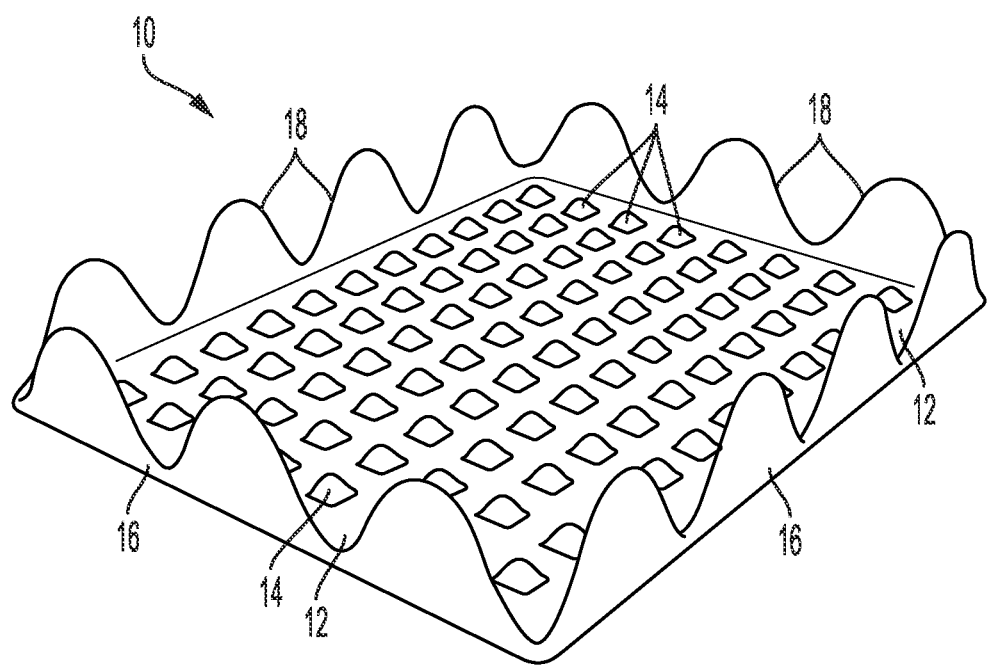
FIG. 1 shows an illustrative diagrammatic view of a shipping tray in accordance with an aspect of the present invention.

FIG. 1, for example, shows a molded shipping tray 10 made from, for example, cardboard pulp. The shipping tray includes a bottom panel 12 that includes an array of protrusions 14, as well as four side walls 16, each of which includes a series of intermittently extending wall portions 18. The protrusions may be any of flat-topped, rounded-topped or pointed, and the sides may be any of rounded or flat with two, three, four or more sides. When an object is placed onto the top of the bottom panel of the tray, for example using a programmable motion device such as a robotic articulated arm as discussed in further detail below, the protrusions (either in a grid array or other layout) inhibit the object from moving (such as by rolling) any significant distance. In certain aspects, as also further discussed below, the system may know the limited extent that an object may move (roll) knowing the object's geometry and the height of and distance between the protrusions. The protrusions, in other words, control and limit any rolling. The object falls into the nearest low area between protrusions; how far it rolls is determined by the spacing of the grid. In this way, when a robot goes to place a second object into the tray, the control system may do so under the assumption that the first object has not moved significantly, and may in fact, know the amount of movement undergone by the object.

Figure 2:
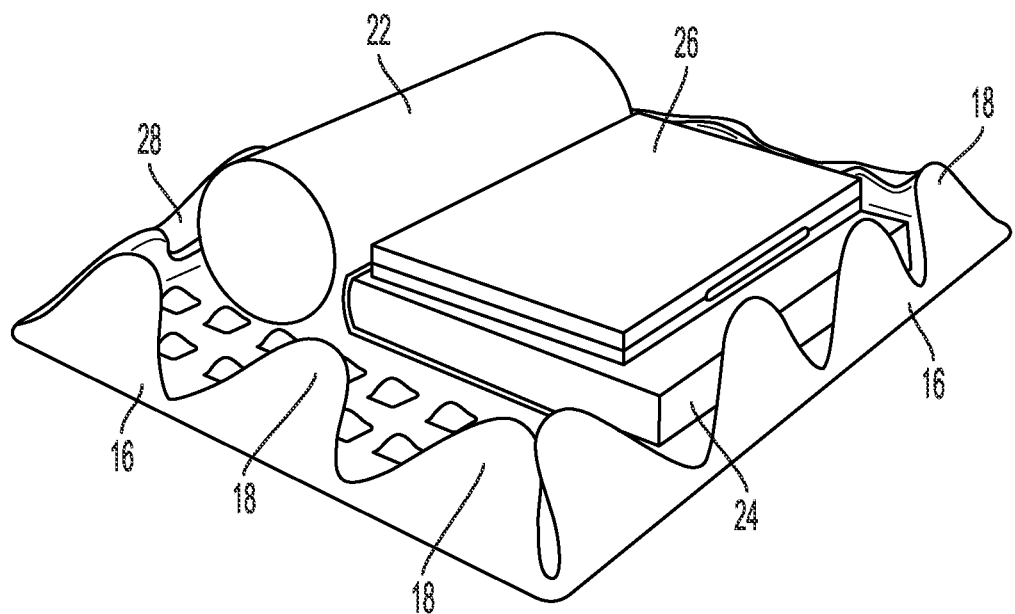
FIG. 2 shows an illustrative diagrammatic view of the shipping tray of FIG. 1 containing objects and being wrapped for processing.
Figure 3:
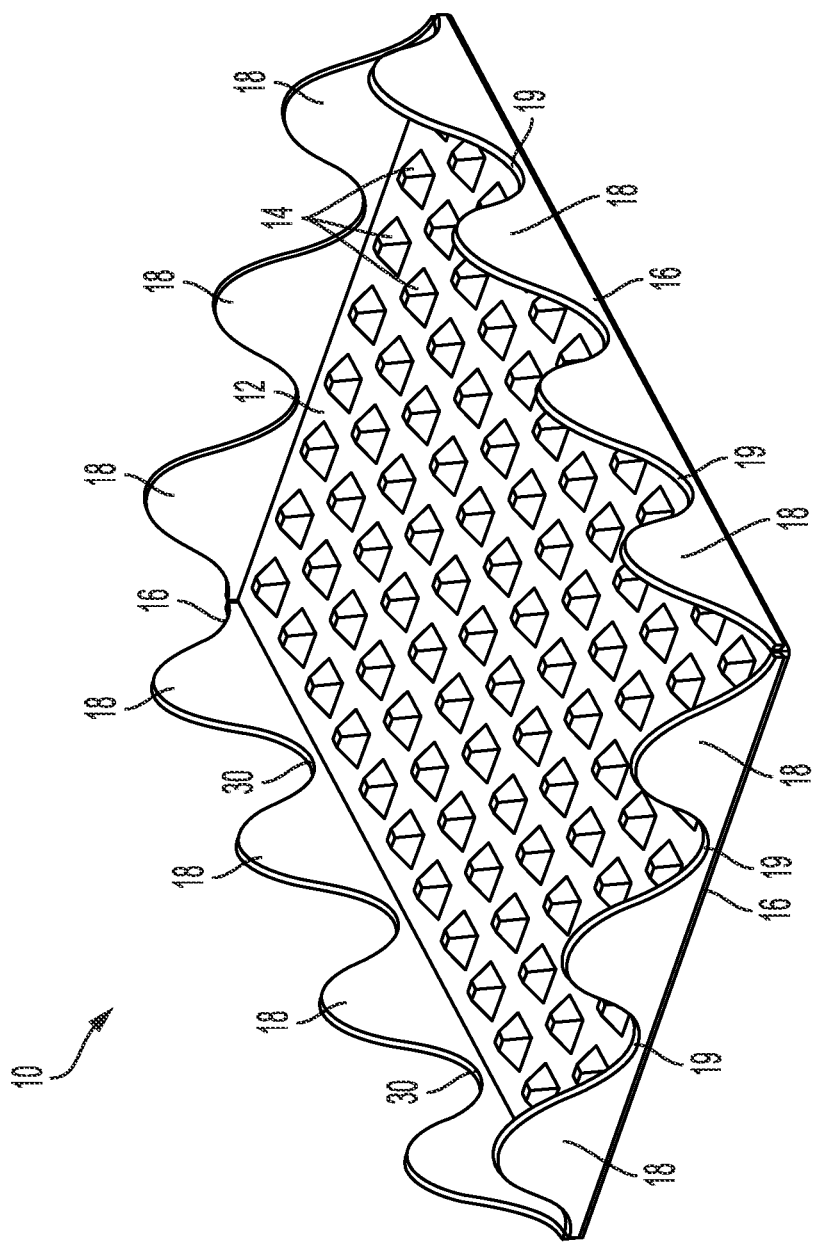
FIG. 3 shows an illustrative diagrammatic view of a shipping tray in accordance with another aspect of the present invention.

FIG. 2 shows at 20 a loaded and wrapped shipping tray, in which the tray 10 includes objects 22, 24, 26 that have been placed onto the tray, as well as a shrink wrap sealing material 28 that has been applied to the loaded shipping tray in accordance with an aspect of the present invention. FIG. 3 shows the shipping tray 10 in more detail, in which it may be seen that the wall portions 18 are curved (e.g., generally sinusoidal), and the sections 19 of the walls between the intermittently extending wall portions 18 may be of a smaller height (e.g., 5%, 10%, 15% of the height of the wall portions 18). The sections 19 may facilitate in maintaining the upright nature of the wall portions 18 during loading, yet provide enough flexibility for the wall portions 18 to conform to the package and contents during wrapping.

Figure 4:
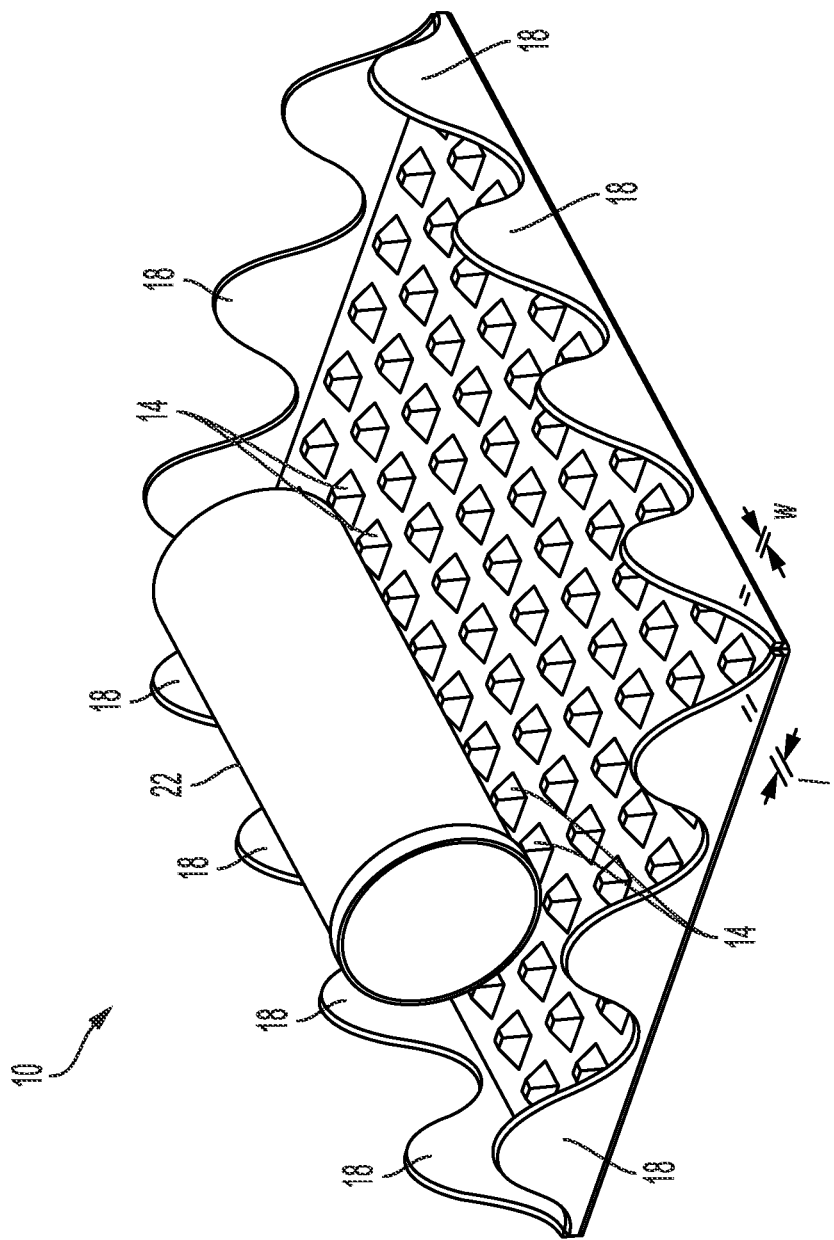
FIG. 4 shows an illustrative diagrammatic view of the shipping tray of FIG. 3 including an object with low position authority deposited therein.
Figure 5A:
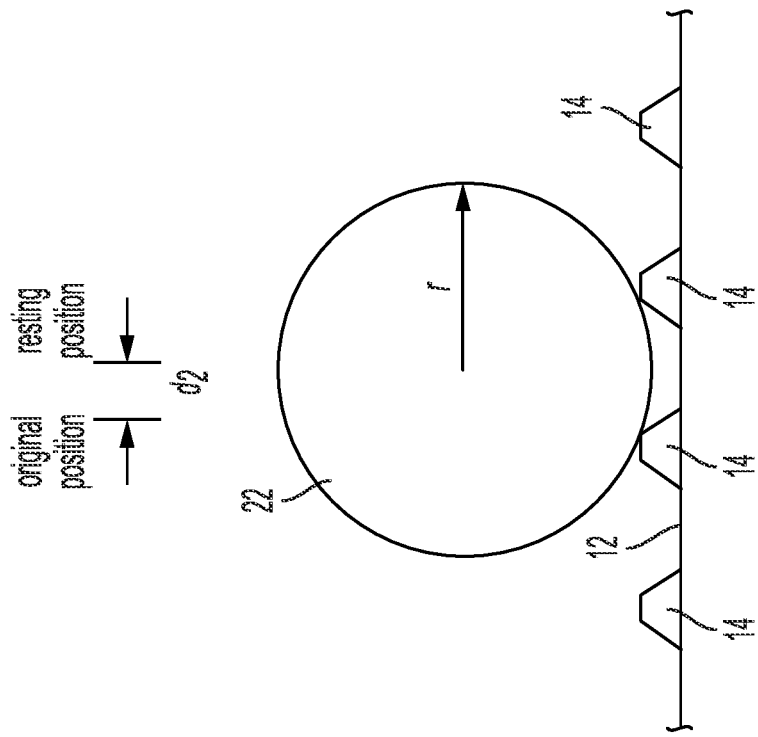
FIGS. 5A and 5B show illustrative diagrammatic side partial views of the object moving (FIG. 5A) and coming to rest (FIG. 5B) in the shipping tray of FIG. 3.
Figure 5B:
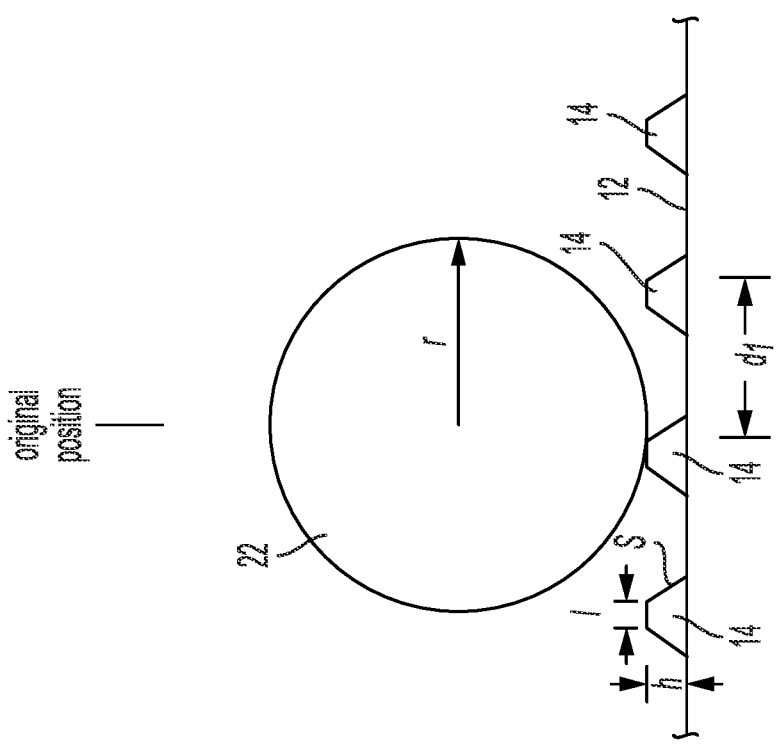

Once objects are placed into the tray, the side walls (molded to stand straight up) prevent any objects from easily falling out of the tray during transport (e.g., conveyor transport). With reference to FIG. 4, the protrusions 14 may further act to retain the object 22 that may have low placement authority (again, the ability to remain in a position/location when placed). In particular, and with reference to FIGS. 5A and 5B, when the object 22 is first placed onto the floor 12 of the tray, the system (e.g., including one or more computer processing systems 100 shown in FIGS. 10-12), may assume a limited range of movement of the object, of for example, a known distance ($d_1$) of spacing between the protrusions 14. In accordance with further aspects, the system may even know the geometry of the object 22, and if round or cylindrical, it's radius (r), as well as the geometry of the tops of the protrusions, e.g., height h, length l, width w (orthogonal to length and height), as well as slope s. The system may even determine exactly how far ($d_2$) the object 22 may move and in which direction. If the object has sufficient pose authority (again, the ability to maintain its shape while being held by an end effector), the system may place the object in a desired orientation on the shipping tray.

Knowing where the object 22 was placed by a programmable motion device (such as a robot) on the bottom panel 12 of the tray 10, and knowing the above parameters about the shipping tray, and in particular the geometry of the protrusion 14, the system may know a maximum distance ($d_1$) that the object 22 may move, and/or may know the exact distance ($d_2$) that the object 22 will move on the bottom panel 12. This information is very important to an automated processing system that will be loading further objects onto the shipping tray. If an object moves and blocks a further object from being placed onto the tray, the system may encounter an error condition as fundamental assumptions regarding, for example, distance to the bottom panel 12, will be violated. The use of, and knowledge of, a standardized shipping tray having certain geometric parameters, permits the automated processing system to set boundary conditions around which the system may smoothly operate.

Figure 6:
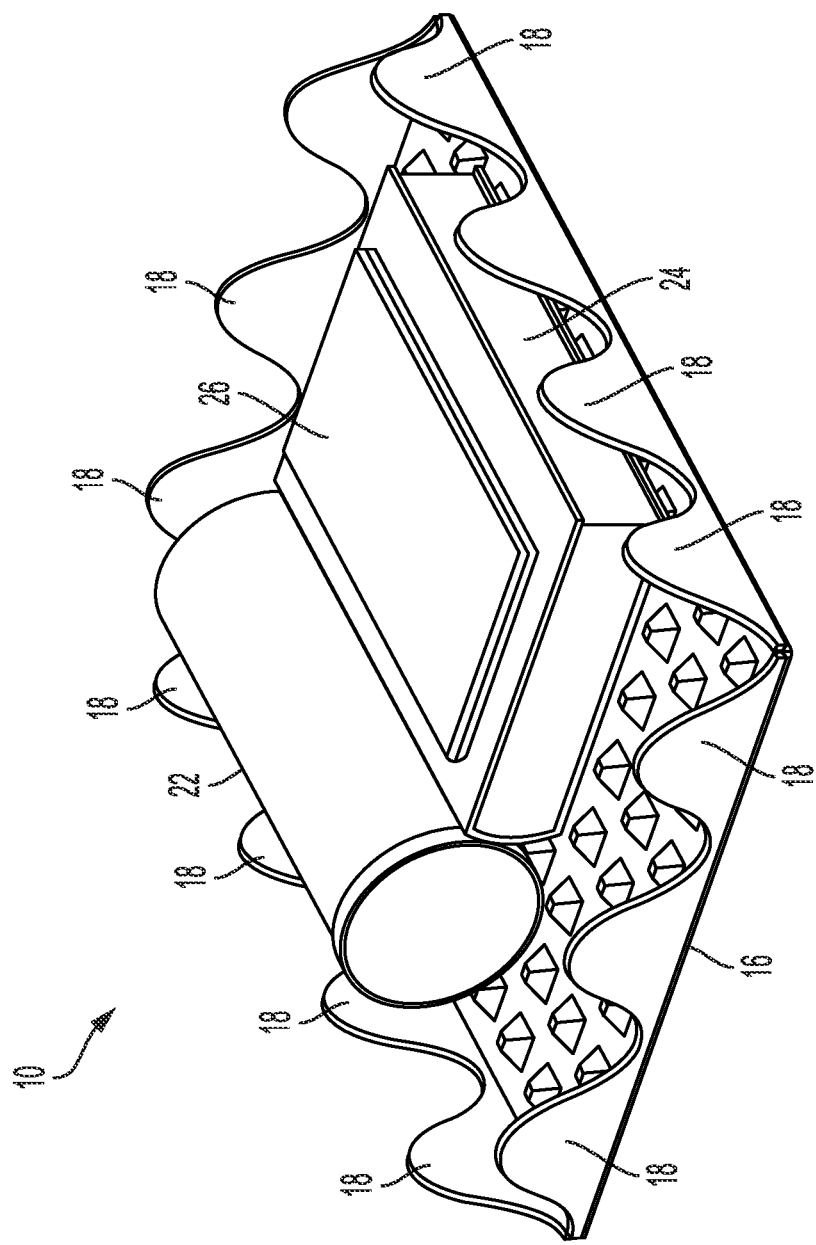
FIG. 6 shows an illustrative diagrammatic view of the shipping tray of FIG. 3 loaded with multiple objects of different position authority.
Figure 7:
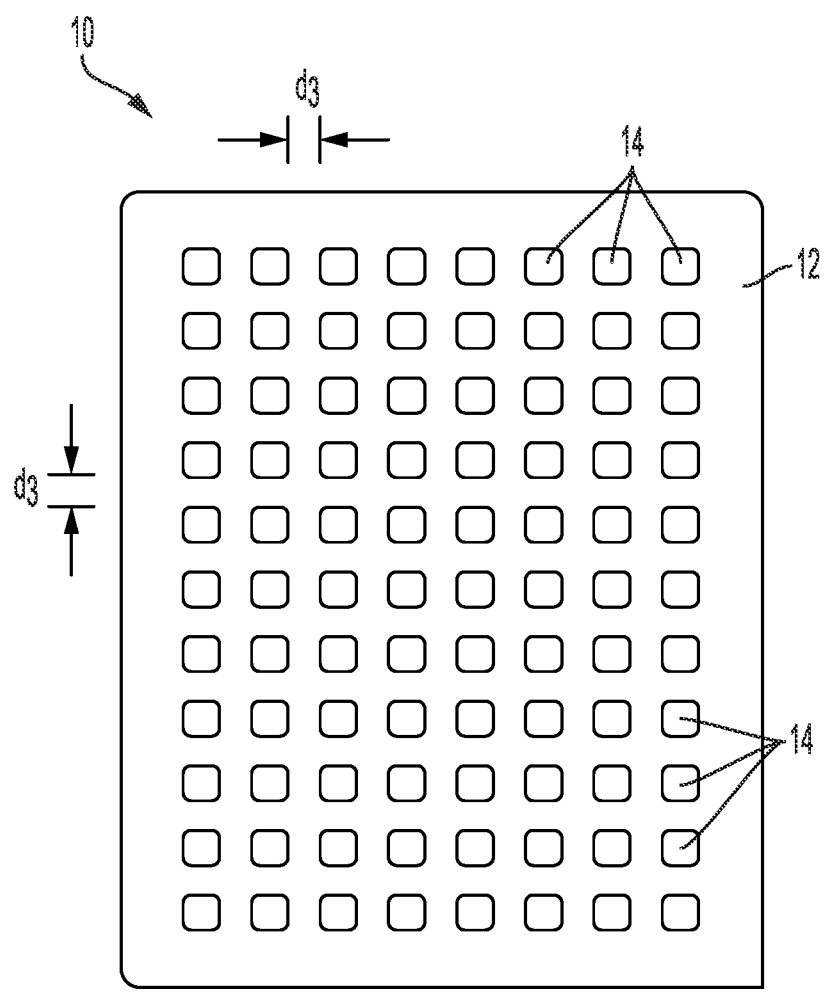
FIG. 7 shows an illustrative diagrammatic top view of the shipping tray of FIG. 1.

With reference to FIG. 6, the system may then load additional objects 24, 26 onto the shipping tray 10, knowing the exact or boundaried location of the first item 22. Knowing the geometry and placement of the objects facilitates knowing whether, and how much, an object may move. For example, knowing the object 24 is a book, the system may assume that the object will remain at the location where it is deposited onto the shipping tray, while know that a different object is any of round, cylindrical or unevenly shaped on the underside thereof, will facilitate the system knowing boundary conditions regarding the placement and resting place of the different object. FIG. 7 shows a top view of the shipping tray 10 of FIG. 1, showing an order spacing $d_3$ of the bases of the protrusions 14, which are arranged in an ordered array.

Figure 8:
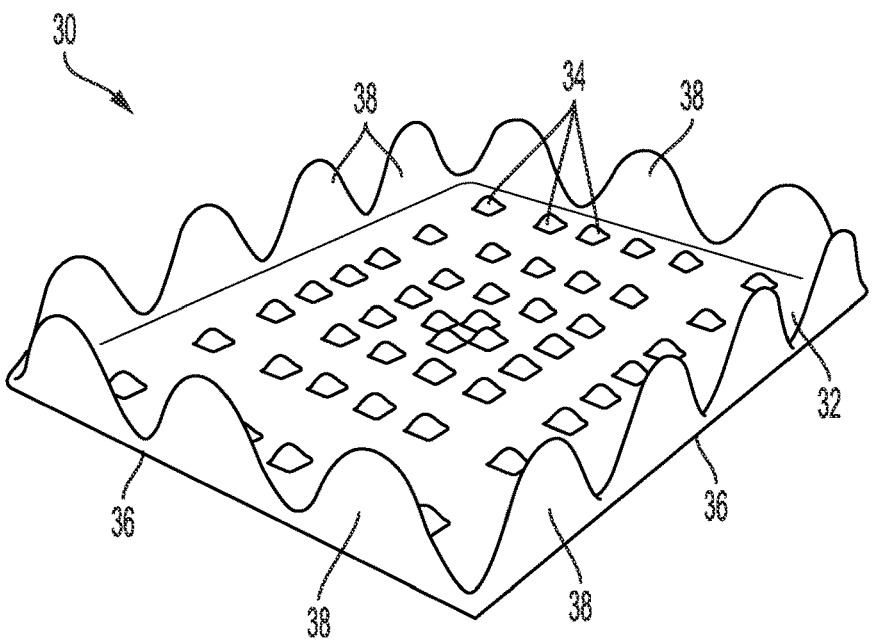
FIG. 8 shows an illustrative diagrammatic view of a shipping tray in accordance with another aspect of the present invention including protrusions including varying distances between protrusions.
Figure 9:
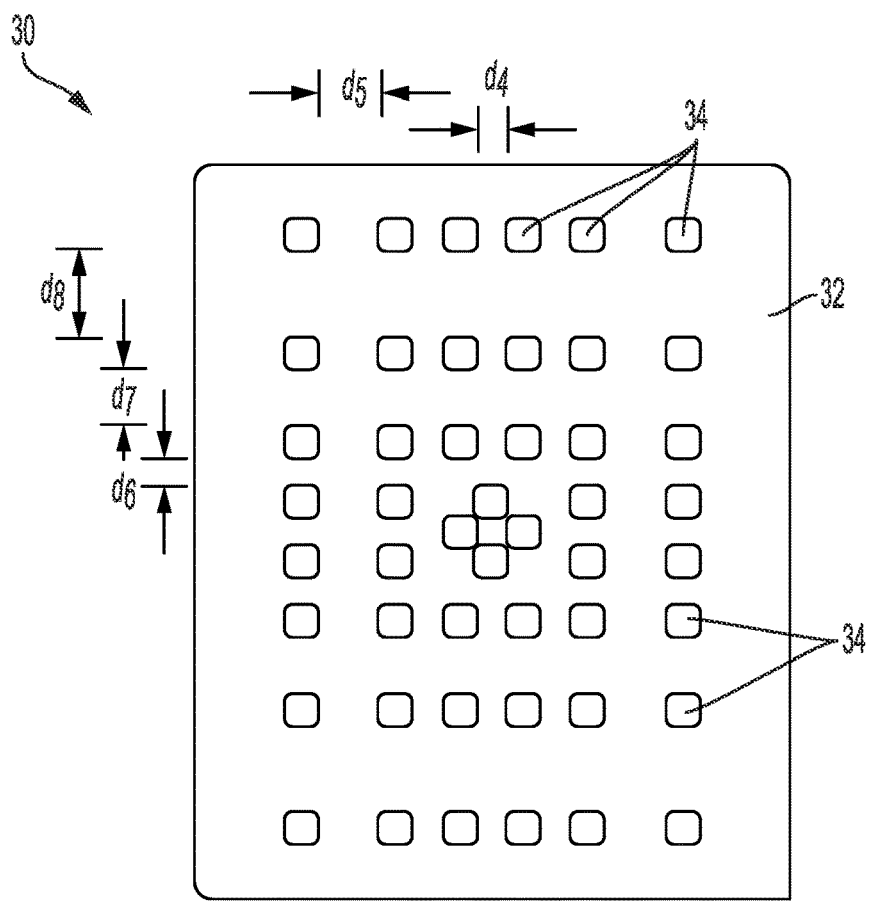
FIG. 9 shows an illustrative diagrammatic top view of the shipping tray of FIG. 9.

The set of protrusions may form any of an ordered array of protrusions, an ordered set of protrusions, or a non-ordered set of protrusions. For example, FIGS. 8 and 9 show a shipping tray 30 made from, for example, cardboard pulp. The shipping tray 30 includes a bottom panel 32 that includes an array of protrusions 34 that are spaced non-uniform distances from one another, as well as four side walls 36, each of which includes a series of intermittently extending wall portions 38. The protrusions may be mutually spaced from one another by an amount in one direction (e.g., left to right) that varies such as between distances $d_4$ and $d_5$, and may be mutually spaced from one another by an amount in another direction (e.g., left to right) that varies such as between distances $d_6$, $d_7$ and $d_8$. The variation of the protrusion spacing may be symmetrical as shown, or may vary across the full width and length of the tray 30.

Figure 10:
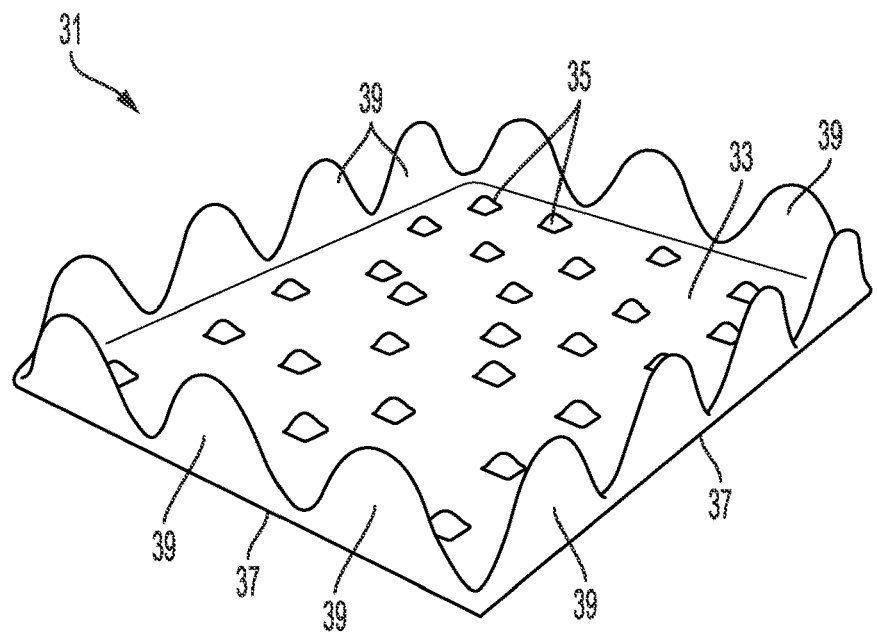
FIG. 10 shows an illustrative diagrammatic view of a shipping tray in accordance with a further aspect of the present invention including a non-ordered array of protrusions.
Figure 11:
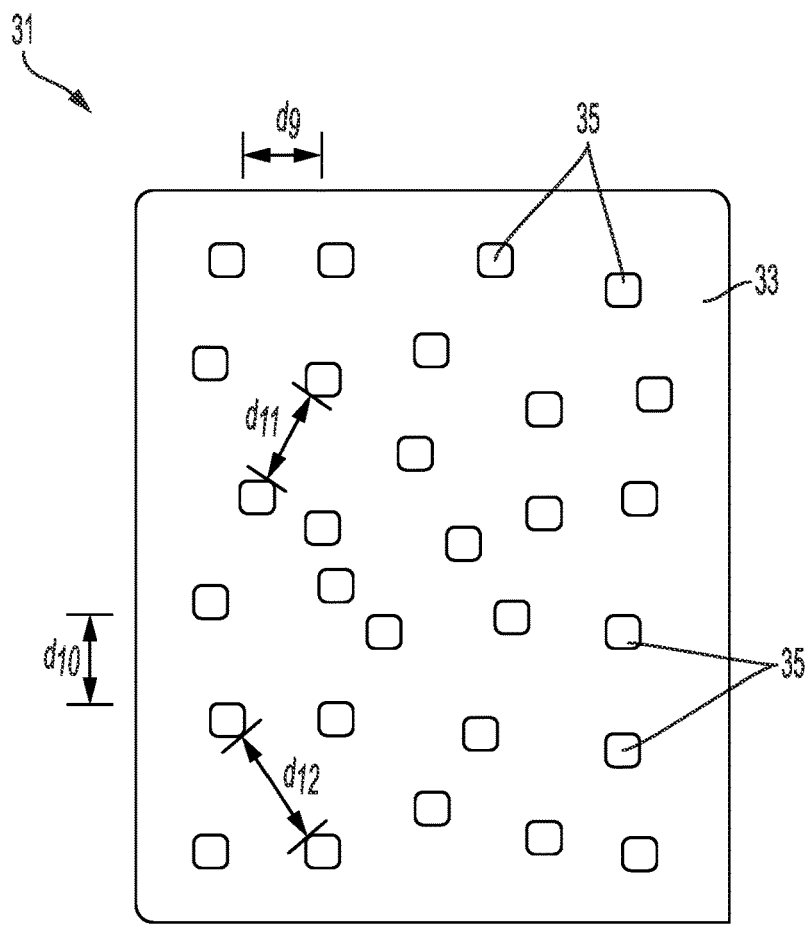
FIG. 11 shows an illustrative diagrammatic top view of the shipping tray of FIG. 10.

FIGS. 10 and 11 show a shipping tray 31 made from, for example, cardboard pulp. The shipping tray 31 includes a bottom panel 33 that includes an array of protrusions 35 that are spaced non-uniform distances from one another, as well as four side walls 37, each of which includes a series of intermittently extending wall portions 39. The protrusions may be randomly distributed about the bottom panel 33 of the tray 31, providing a wide variety of distances $d_9$, $d_{10}$ and $d_{12}$. The variations of the positioning of the protrusion may be known by the processing system, and may be used to facilitate placement of specifically sized objects onto the tray.

Again, the protrusions 34, 35 may be any of flat-topped, rounded-topped or pointed, and the sides may be any of rounded or flat with two, three, four or more sides. When an object is placed onto the top of the bottom panel of the tray, for example using a programmable motion device such as a robotic articulated arm as discussed in further detail below, the protrusions (either in a grid array or other non-ordered layout) inhibit the object from moving (such as by rolling) any significant distance. In certain aspects, as also further discussed below, the system may know the limited extent that an object may move (roll) knowing the object's geometry and the height of and distance between the protrusions. The protrusions, in other words, control and limit any rolling.

Figure 12:
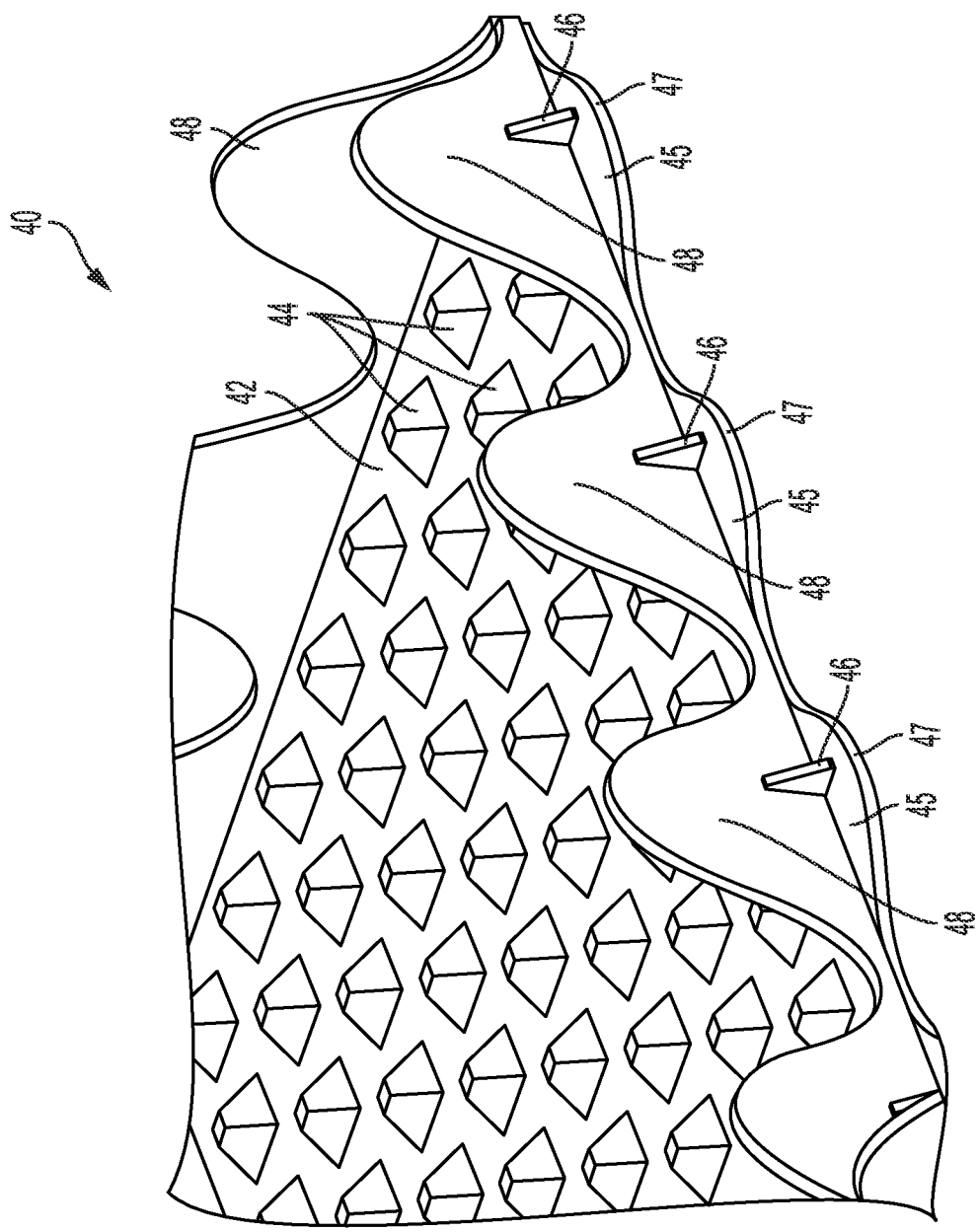
FIG. 12 shows an illustrative diagrammatic view of a shipping tray in accordance with another aspect of the present invention that includes wall braces.

The shipping trays may be stored in batches (e.g., stacked) prior to use, and may be provided on an infeed conveyor to a programmable motion device as discussed in further detail below. During such handling however, the wall portions 18 may become compromised in certain applications where care is not sufficiently taken to ensure that the wall portions 18 remain upright prior to packaging, which is particularly problematic if the wall portions become bent away from the bottom panel 12. In accordance with a further embodiment of the present invention, and as shown in FIG. 12, a shipping tray 40 may include similar protrusions 44 on a bottom panel 42, as well as wall portions 48, and may further include extended bottom panel portions 45 as well as braces 46 that are each attached to the extended bottom panel portions 45 but are not attached to the adjacent wall portions 48. The braces 46 inhibit the wall portions from being bent away from the bottom panel 42, yet permit the wall portions 18 to be bent toward the bottom panel 42 during shrink wrapping. The extended bottom panel portions 45 and the braces 46 also are sized to not interfere with the shrink wrap material when wrapped, as the outer edges 47 of the extended bottom panel portions 45 are (similar to the top portions of the wall portions 48) rounded so as to not impart excess localized stress on the shrink wrap material.

Figure 13:
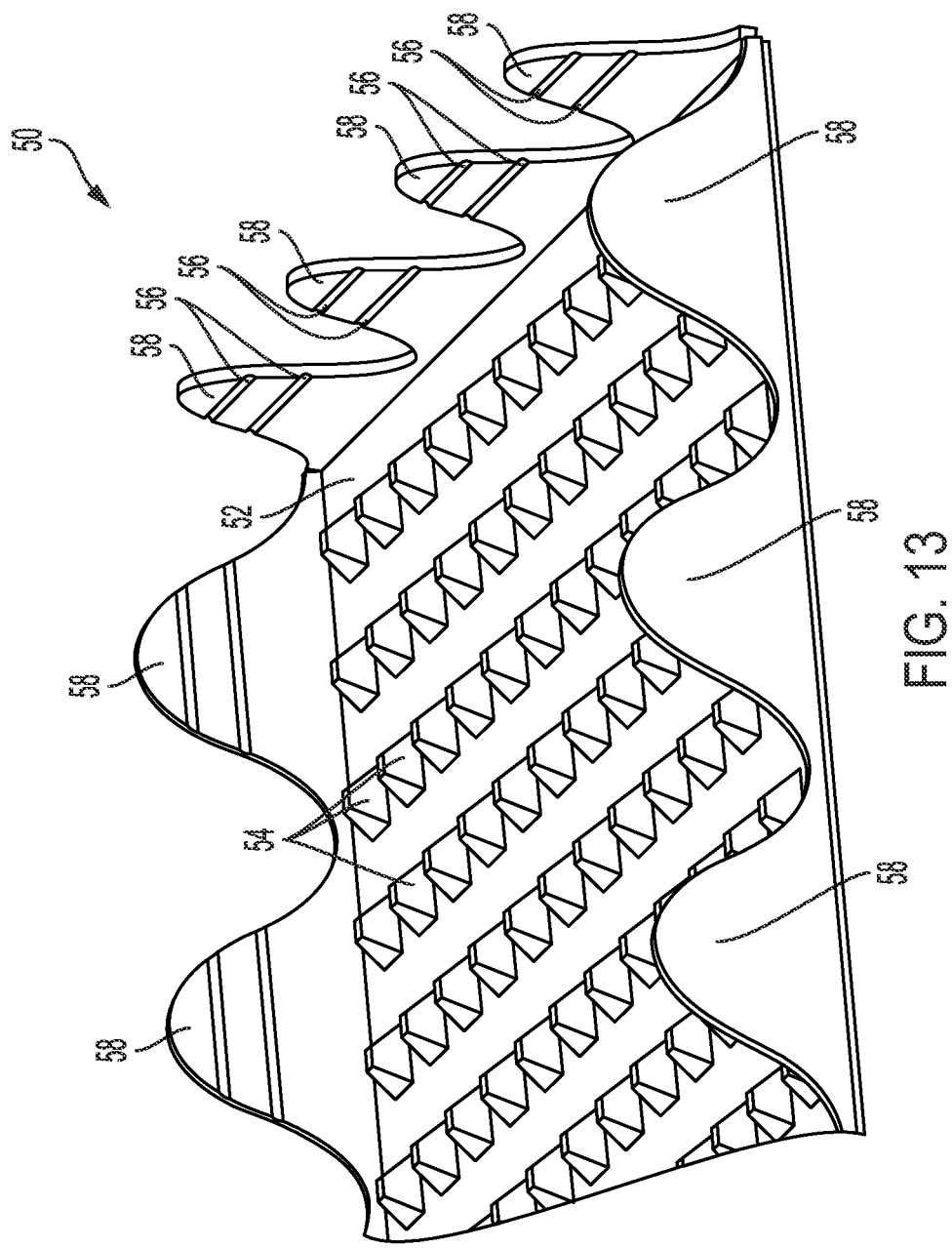
FIG. 13 shows an illustrative diagrammatic view of a shipping tray in accordance with another aspect of the present invention that includes directional bending features.
Figure 14:
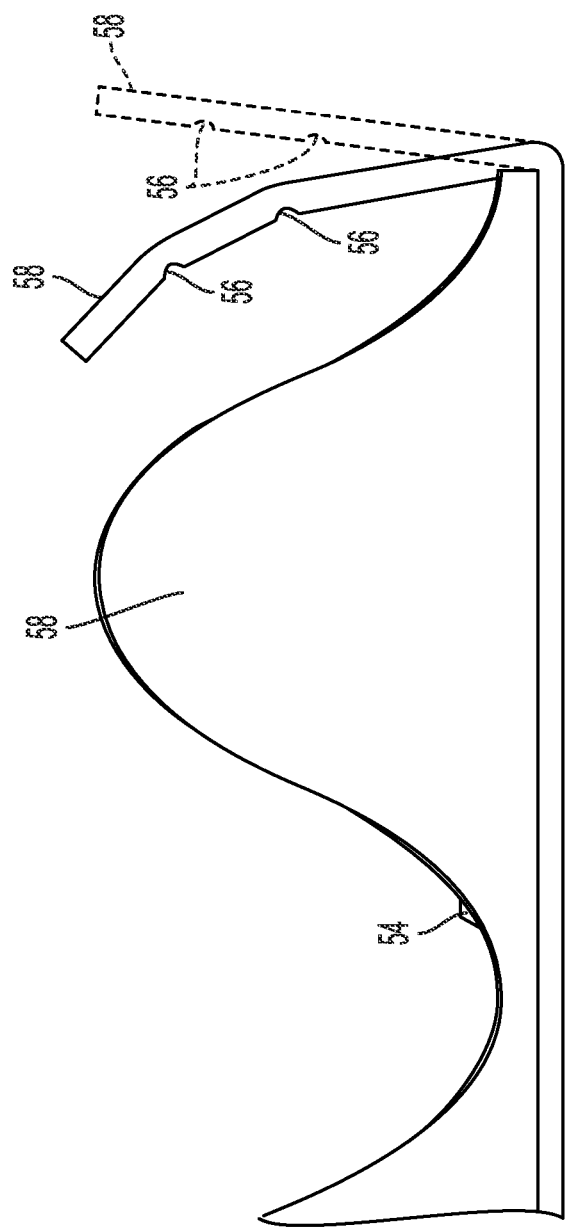
FIG. 14 shows an illustrative diagrammatic side view of a portion of the shipping tray of FIG. 13.

In accordance with a further embodiment, and with reference to FIGS. 13 and 14, a shipping tray 50 may include similar protrusions 54 on a bottom panel 52, as well as wall portions 58, and may further include directional bend features 56 on the inner surface of the wall portions 58 that inhibit the wall portions 58 from bending away from the bottom panel 52, yet permit the wall portions 58 to be bent toward the bottom panel 52 during shrink wrapping. In further embodiments, individual shipping trays may further include both braces such as braces 46 as well as directional bend features such as features 56 on the same shipping trays.

Figure 15:
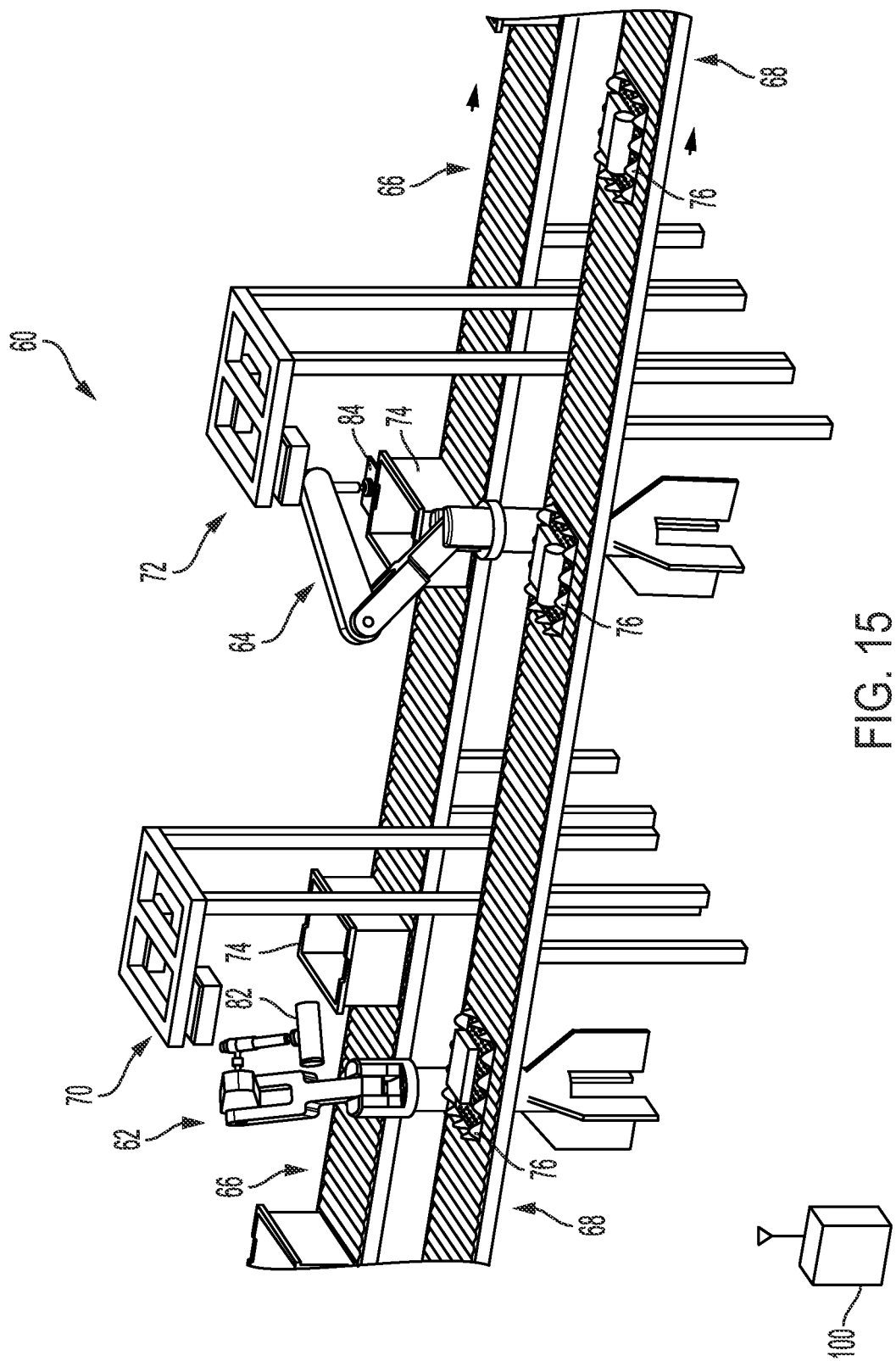
FIG. 15 shows an illustrative diagrammatic view of an object processing system employing shipping trays in accordance with an aspect of the invention.
Figure 16:
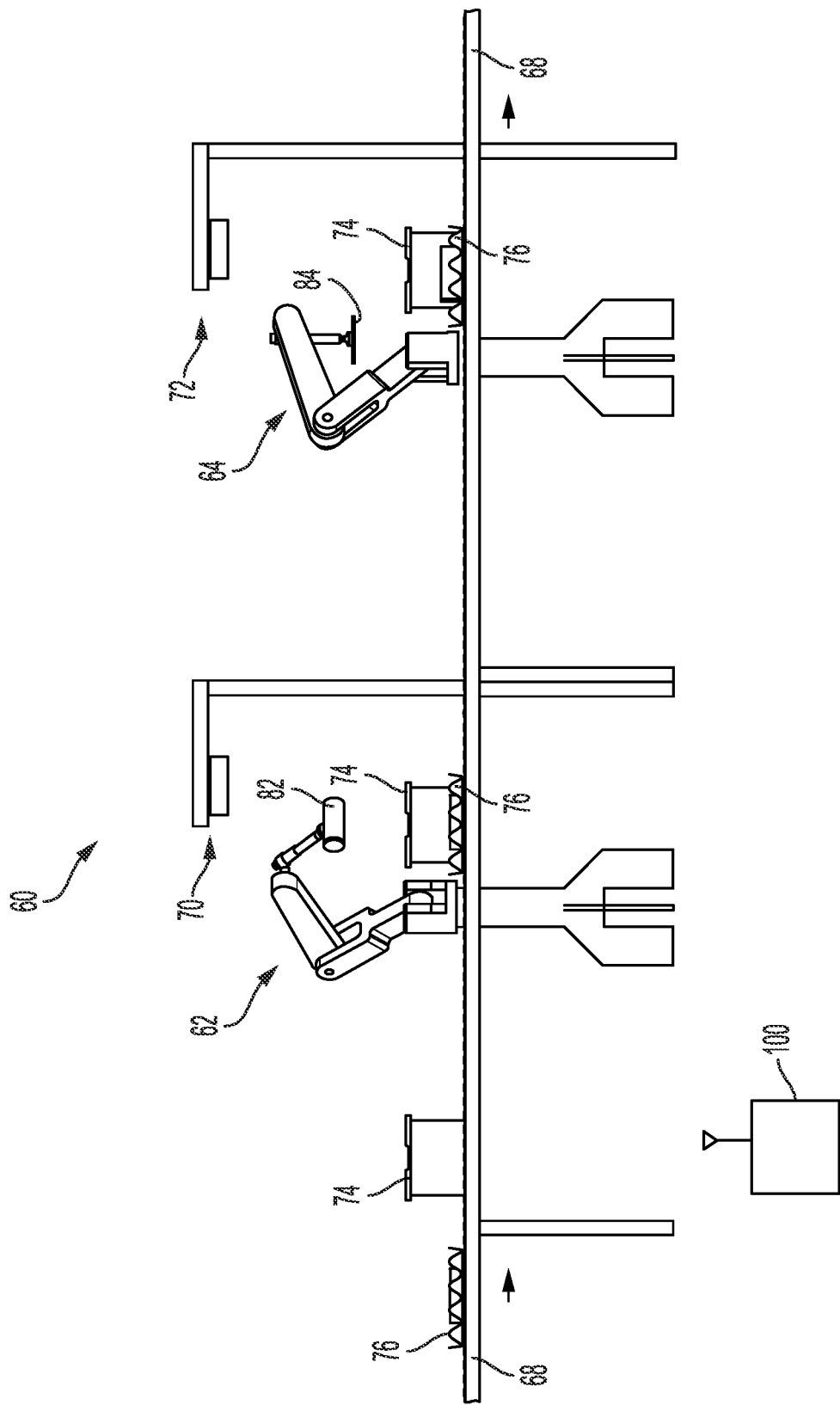
FIG. 16 shows an illustrative diagrammatic side view of the object processing system of FIG. 15.

Any of the embodiments of shipping trays discussed or noted above may be used in a system employing a programmable motion device for automated processing of the objects and the shipping trays. FIGS. 15 and 16 for example, show an automated processing system 60 in accordance with an embodiment of the invention that includes programmable motion devices 62, 64 such as robotic articulated arms that are positioned between an object conveyor 66 and a shipping tray conveyor 68, and are positioned adjacent a respective perception system 70, 72. The objects may arrive in totes 74, and the shipping trays 80 are provided on the shipping tray infeed conveyor. Each programmable motion device 62, 64 is employed to move a selected object from a tote 74 (or directly from the object conveyor 66 itself) to a shipping tray 76. The programmable motion devices 62, 64 may, for example, employ vacuum or other grippers to grasp the objects.

Figure 17:
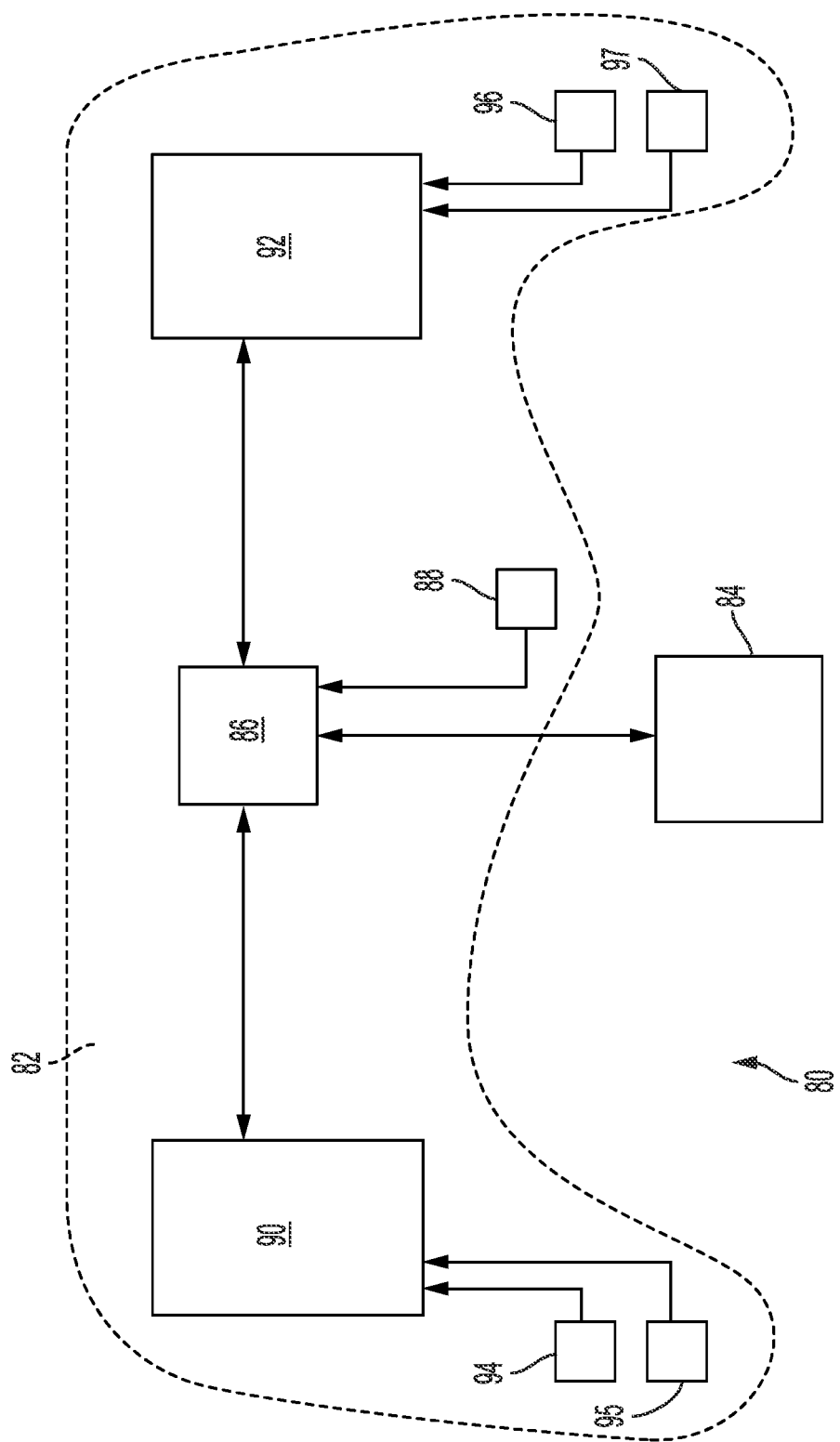
FIG. 17 shows an illustrative diagrammatic view of an object processing system including a placement planning system in accordance with an aspect of the present invention.

With reference to FIG. 17, the object processing system (e.g., packaging fulfillment system) 80 includes a placement planning system 82 that communicates with a programmable motion device 84 such as an articulated arm robot as discussed above. The programmable motioned device 84 is coupled to the placement planning system via a processing controller 86 that also receives pose input from a pose detection device 88 regarding a pose of an object being held by the end effector of the programmable motion device. The processing controller 86 receives placement authority data from a placement authority non-transitory memory system 90, and receives protrusion pattern data from a shipping tray pattern non-transitory memory system 92. The placement authority non-transitory memory system 90 may receive input from one or more sources 94, 95 including, for example, a warehouse management system, a master SKU database and a learned information data processing system. The shipping tray pattern non-transitory memory system 92 may receive input from one or more sources 96, 97 including, for example, a warehouse management system, and a learned information data processing system.

Each loaded tray is then provided to a shrink wrapping station, where shrink wrap film (e.g., polyvinyl chloride (PVC) shrink film, polyolefin (POF) shrink film, or polyethylene (PE) shrink film) is provided as a sheet above and a sheet below the loaded tray. The sandwiched product may be subjected to a shrink wrap oven elevated temperature (e.g., 250° F. to 350° F.), and the above and below shrink films will first seal at the edges, and then shrink around the loaded tray. The remaining sheet may either be shed by the sealing process itself, or may be cut either prior to or following being subjected to the elevated temperature.

Figure 18:
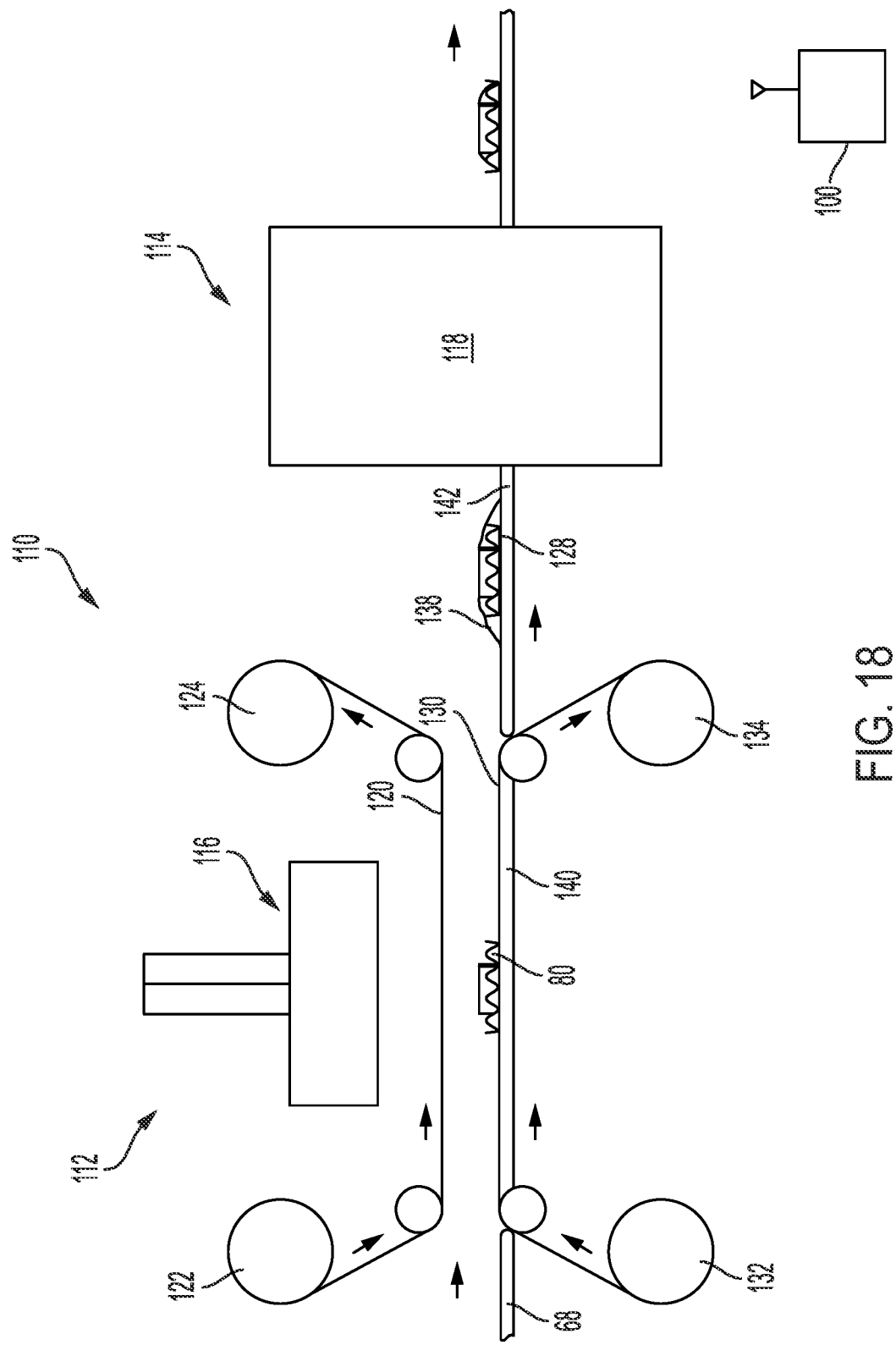
FIG. 18 shows an illustrative diagrammatic side view of a wrapping station on an object processing system that employs shipping trays in accordance with an aspect of the invention.

FIG. 18 shows an automated shrink wrap system 110 for use in connection with the automated processing system 60 of FIGS. 10 and 11. In particular, the system 110 receives loaded shipping trays from the shipping tray conveyor 68, and provides the loaded shipping trays to a covering station 112, which is followed by a high temperature application station 114. The covering station 112 includes a pair of sheets 120, 130 of shrink wrap film material. The top sheet 120 of shrink wrap film material is unwound from a feed spool 122 above the shipping tray 80 and its remaining web (remaining after stamping) is wound on a pickup spool 124 following stamping. Similarly, the bottom sheet 130 of shrink wrap film material is unwound from a feed spool 132 below the shipping tray 80 and its remaining web (remaining after stamping) is wound on a pickup spool 134 following stamping. The conveyor may be provided in sections, permitting the bottom sheet 130 to be brought under each shipping tray 80. The covering station 112 further includes a stamping device that descends upon the sheets 120, 130, and stamps out above and below covering portions 128, 138 above and below each shipping tray 80. The stamping is achieved using a stamping device 116 having blades on the bottom portion thereof in the shape of the desired covering portions 128, 138. In accordance with various embodiments, the stamping device 116 may further include the application of heat at the blades and/or the system may include a heated back under the conveyor section 140 that carries the shipping tray 80 through the covering station 112.

The covered shipping tray 80 is then moved by a further conveyor section 142 to the high temperature application station 114, at which the sandwiched product may be subjected to a shrink wrap oven elevated temperature (e.g., 250° F. to 350° F.), and the above and below covering portions will first seal at the edges, and then shrink around the loaded tray. During the application of heat, the sidewall flaps that aided in keeping the one or more objects in the tray, now fold down onto the object(s) due to the force of the shrink wrap shrinking over the sidewall flaps, drawing them inward. Initially, when subjected to heat, the shrink wrap top sheet seals to the shrink wrap bottom sheet at the points where the sheets contact each other along the outer perimeter of the tray. Once the sheets are sealed together, the sheets both continue to shrink above and below the tray, and the top sheets shrinking while held to the bottom sheet at the edges, causes the sidewall flaps to pull inward over the object(s) in the tray, further securing them from movement. The operation of the conveyors, programmable motion devices, covering station 112 and high temperature application station 114 are governed by the one or more processing systems 100.

Figure 19:
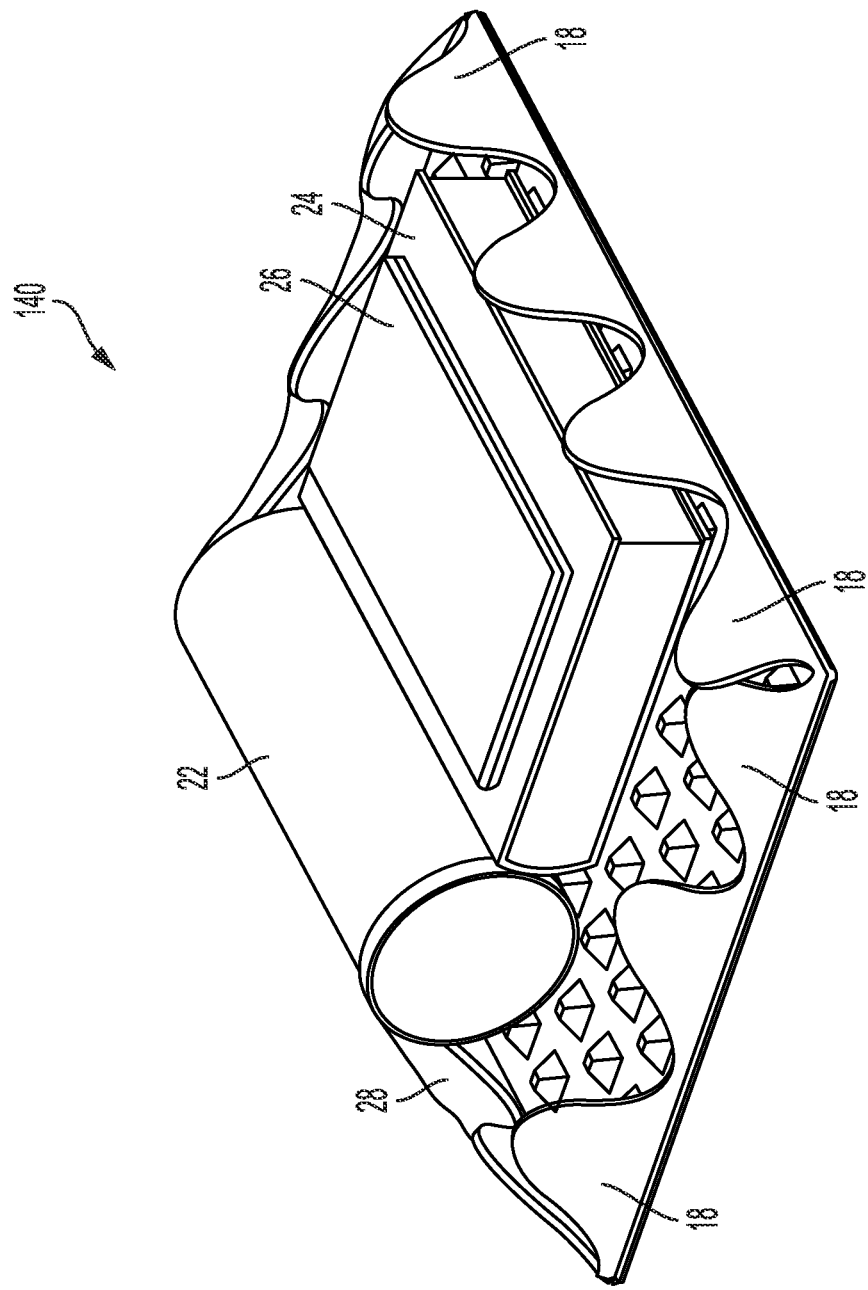
FIG. 19 shows an illustrative diagrammatic view of a loaded and wrapped shipping tray in accordance with an aspect of the invention.

The wrapped shipping tray 140 (as shown in FIG. 19) accommodates the objects 22, 24, 26 by permitting the objects to be readily placed into and maintained in the shipping tray, while also permitting the curved wall portions to adjust to the shipping tray and its contents such that different wall portions may bend different amounts as shown in FIG. 19. By use of the sidewall flaps, therefore, the tray is designed to be deformable under the force applied to the sidewall flaps under for force of the shrink wrapping. The sealed package 140 may now be placed into a box 142 or shipping bag for shipment as shown in FIG. 20.

Each of the above disclosed aspects and features may be used in combination with other disclosed aspects and features. Those skilled in the art will appreciate that numerous modifications and variations may be made to the above disclosed embodiments without departing from the spirit and scope of the present invention.

What is claimed is:

1. A shipping tray for use in a packaging fulfillment system, said shipping tray comprising:
    a bottom panel that includes a plurality of raised portions that assist to inhibit rolling of an object within the shipping tray along the bottom panel; and
    four side walls extending upward from the bottom panel, each side wall having a plurality of intermittently extending wall portions that extend upward and alternate with a plurality of shorter wall portions, each of the plurality of intermittently extending wall portions being foldable inward under a force of a wrapping.

2. The shipping tray as claimed in claim 1, wherein the shipping tray is formed of a molded material.

3. The shipping tray as claimed in claim 1, wherein the shipping tray is formed of a molded cardboard pulp material.

4. The shipping tray as claimed in claim 1, wherein each of the four side walls has a height that is no more than about ¼ of any direct distance across the bottom panel.

5. The shipping tray as claimed in claim 1, wherein the plurality of intermittently extending wall portions alternate with the plurality of shorter wall portions such that a top portion of each side wall has a sinusoidal shape.

6. The shipping tray as claimed in claim 1, wherein each wall portion of the plurality of intermittently extending wall portions includes a retention brace to inhibit any folding of the respective wall portion away from an interior of the shipping tray.

7. The shipping tray as claimed in claim 1, wherein each of the plurality of intermittently extending wall portions includes a plurality of directional bend features on an inner surface thereof that facilitate folding of the respective wall portion inward toward an interior of the shipping tray.

8. The shipping tray as claimed in claim 1, wherein the plurality of raised portions includes an ordered array of bumps.

9. The shipping tray as claimed in claim 1, wherein the plurality of raised portions includes a non-ordered array of bumps.

10. The shipping tray as claimed in claim 1, wherein the plurality of raised portions includes a collection of bumps of varying distances from mutually adjacent bumps.

11. The shipping tray as claimed in claim 1, wherein the plurality of intermittently extending wall portions of each side wall includes curved wall portions.

12. The shipping tray as claimed in claim 11, wherein the curved wall portions provide each of the four side walls with a sinusoidal shape.

13. The shipping tray as claimed in claim 11, wherein the curved wall portions of each of the four side walls are capable of bending different amounts to adjust to any contents provided on the bottom panel.

14. The shipping tray as claimed in claim 11, wherein the curved wall portions of each of the four side walls include directional bend features on an inner surface thereof.

15. The shipping tray as claimed in claim 14, wherein the directional bend features of each curved wall portion facilitate the curved wall portion bending toward the bottom panel.

16. A packaging fulfillment system comprising:
    a shipping tray that includes a bottom panel having a pattern of bumps, and at least two flexible side panels; and a placement planning system for planning placement of objects into the shipping tray, wherein the placement planning system accesses bump pattern data representative of the pattern of bumps on the shipping tray and placement authority data associated with each object to be placed in the shipping tray, the placement authority data being representative of an ability of an object to remain in a position or location when placed, and wherein the placement of objects into the shipping tray is planned at least in part responsive to the placement authority data and further responsive to the bump pattern data.

17. The packaging fulfillment system as claimed in claim 16, wherein the shipping tray is formed of a molded material.

18. The packaging fulfillment system as claimed in claim 16, wherein the shipping tray is formed of a molded cardboard pulp material.

19. The packaging fulfillment system as claimed in claim 16, wherein the at least two flexible side panels have a height that is no more than about ¼ of any direct distance across the bottom panel.

20. The packaging fulfillment system as claimed in claim 16, wherein the at least two flexible side panels are provided as part of four sets of rounded panels, each set being positioned around one of four sides of the bottom panel.

21. The packaging fulfillment system as claimed in claim 16, wherein the at least two flexible side panels have a sinusoidal shape.

22. The packaging fulfillment system as claimed in claim 16, wherein each of the at least two flexible side panels includes a retention brace to inhibit any folding of the panel away from an interior of the shipping tray.

23. The packaging fulfillment system as claimed in claim 16, wherein each of the at least two flexible side panels includes directional bend features that facilitate folding of the panel toward an interior of the shipping tray.

24. The packaging fulfillment system as claimed in claim 16, wherein the pattern of bumps is an ordered array of bumps.

25. The packaging fulfillment system as claimed in claim 16, wherein the pattern of bumps is a non-ordered array of bumps.

26. The packaging fulfillment system as claimed in claim 16, wherein the pattern of bumps includes bumps varying in distance from mutually adjacent bumps.

27. The packaging fulfillment system as claimed in claim 16, wherein the pattern of bumps are formed integrally on the bottom panel of the shipping tray.

28. The packaging fulfillment system as claimed in claim 16, wherein the pattern of bumps includes bumps having a flat top portion.

29. The packaging fulfillment system as claimed in claim 16, wherein the at least two flexible side panels fold inward under a force of a shrink wrapping.

30. The packaging fulfillment system as claimed in claim 16, wherein the bottom panel of the shipping tray includes extended bottom panel portions and braces attached thereto, the braces inhibiting the at least two flexible side panels from being bent away from the bottom panel.

31. A packaging fulfillment system comprising:
a shipping tray including a bottom panel that includes a plurality of raised portions that assist to inhibit rolling of an object within the shipping tray along the bottom panel, and four side walls extending upward from the bottom panel, each side wall having a plurality of extending wall portions alternate shorter wall portions, wherein the extending wall portions extend a sufficient distance above the shorter wall portions such that each side wall is foldable inward under a force of a wrapping; and
a placement planning system for planning placement of objects into the shipping tray, wherein said placement planning system accesses raised portion data representative of the plurality of raised portions and object data associated with each object, and assigns bounded locations with respect to a placement of each object in the shipping tray responsive to the raised portion data and the object data.

32. The packaging fulfillment system as claimed in claim 31, wherein the plurality of raised portions is provided as an array of raised portions.

33. The packaging fulfillment system as claimed in claim 31, wherein the shipping tray is formed of a molded cardboard pulp material.

34. The packaging fulfillment system as claimed in claim 31, wherein each of the four side walls has a height that is no more than about ¼ of any direct distance across the bottom panel.

35. The packaging fulfillment system as claimed in claim 31, wherein the plurality of intermittently extending wall portions provides each of the four side walls with a sinusoidal shape.

36. The packaging fulfillment system as claimed in claim 31, wherein each of the four side walls includes a retention brace to inhibit any folding of the side wall away from an interior of the shipping tray.

37. The packaging fulfillment system as claimed in claim 31, wherein the plurality of intermittently extending wall portions includes directional bend features that facilitate folding of the panel inward toward an interior of the shipping tray.

38. A shipping tray for use in a packaging fulfillment system, said shipping tray comprising:
a bottom panel that includes a plurality of raised portions that assist to inhibit rolling of an object within the shipping tray along the bottom panel; and
four side walls, each side wall having a plurality of intermittently extending wall portions that fold inward under a force of a wrapping, wherein the plurality of intermittently extending wall portions provide each of the four side walls with a sinusoidal shape.

39. The shipping tray as claimed in claim 38, wherein the shipping tray is formed of a molded material.

40. The shipping tray as claimed in claim 38, wherein the shipping tray is formed of a molded cardboard pulp material.

41. The shipping tray as claimed in claim 38, wherein each of the four side walls has a height that is no more than about ¼ of any direct distance across the bottom panel.

42. The shipping tray as claimed in claim 38, wherein each of the four side walls includes a retention brace to inhibit any folding of the side wall away from an interior of the shipping tray.

43. The shipping tray as claimed in claim 38, wherein each of the plurality of intermittently extending wall portions includes a plurality of directional bend features on an inner surface thereof that facilitate folding of the respective wall portion inward toward an interior of the shipping tray.

44. The shipping tray as claimed in claim 38, wherein the plurality of raised portions includes an ordered array of bumps.

45. The shipping tray as claimed in claim 38, wherein the plurality of raised portions includes a non-ordered array of bumps.

46. The shipping tray as claimed in claim 38, wherein the plurality of raised portions includes a collection of bumps of varying distances from mutually adjacent bumps.

47. A shipping tray for use in a packaging fulfillment system, said shipping tray comprising:
a bottom panel that includes a plurality of raised portions that assist to inhibit rolling of an object within the shipping tray along the bottom panel; and
four side walls, each side wall having a plurality of intermittently extending wall portions that fold inward under a force of a wrapping, wherein each of the four side walls includes a retention brace to inhibit any folding of the side wall away from an interior of the shipping tray.

48. The shipping tray as claimed in claim 47, wherein the shipping tray is formed of a molded material.

49. The shipping tray as claimed in claim 47, wherein the shipping tray is formed of a molded cardboard pulp material.

50. The shipping tray as claimed in claim 47, wherein each of the four side walls has a height that is no more than about ¼ of any direct distance across the bottom panel.

51. The shipping tray as claimed in claim 47, wherein the plurality of intermittently extending wall portions provides each of the four side walls with a sinusoidal shape.

52. The shipping tray as claimed in claim 47, wherein each of the plurality of intermittently extending wall portions includes a plurality of directional bend features on an inner surface thereof that facilitate folding of the respective wall portion inward toward an interior of the shipping tray.

53. The shipping tray as claimed in claim 47, wherein the plurality of raised portions includes an ordered array of bumps.

54. The shipping tray as claimed in claim 47, wherein the plurality of raised portions includes a non-ordered array of bumps.

55. The shipping tray as claimed in claim 47, wherein the plurality of raised portions includes a collection of bumps of varying distances from mutually adjacent bumps.

56. A shipping tray for use in a packaging fulfillment system, said shipping tray comprising:
a bottom panel that includes a plurality of raised portions that assist to inhibit rolling of an object within the shipping tray along the bottom panel; and
four side walls, each side wall having a plurality of intermittently extending wall portions that fold inward under a force of a wrapping, wherein the plurality of intermittently extending wall portions of each side wall includes curved wall portions.

57. The shipping tray as claimed in claim 56, wherein the curved wall portions of each of the four side walls are capable of bending different amounts to adjust to any contents provided on the bottom panel.

58. The shipping tray as claimed in claim 57, wherein the curved wall portions of each of the four side walls include directional bend features on an inner surface thereof.

59. The shipping tray as claimed in claim 58, wherein the directional bend features of each curved wall portion facilitates the curved wall portion bending toward the bottom panel.

60. The shipping tray as claimed in claim 56, wherein the shipping tray is formed of a molded material.

61. The shipping tray as claimed in claim 56, wherein the shipping tray is formed of a molded cardboard pulp material.

62. The shipping tray as claimed in claim 56, wherein each of the four side walls has a height that is no more than about ¼ of any direct distance across the bottom panel.

63. The shipping tray as claimed in claim 56, wherein each of the four side walls includes a retention brace to inhibit any folding of the side wall away from an interior of the shipping tray.

64. The shipping tray as claimed in claim 56, wherein each of the plurality of intermittently extending wall portions includes a plurality of directional bend features on an inner surface thereof that facilitate folding of the respective wall portion inward toward an interior of the shipping tray.

65. The shipping tray as claimed in claim 56, wherein the plurality of raised portions includes an ordered array of bumps.

66. The shipping tray as claimed in claim 56, wherein the plurality of raised portions includes a non-ordered array of bumps.

67. The shipping tray as claimed in claim 56, wherein the plurality of raised portions includes a collection of bumps of varying distances from mutually adjacent bumps.

\* \* \* \* \*